United States Patent [19]

Sasagawa

[11] Patent Number: 5,943,337
[45] Date of Patent: *Aug. 24, 1999

[54] METHOD FOR AN ATM NETWORK WHICH CONTROLS SETTINGS OF A PLURALITY OF CONNECTIONS AND APPARATUS AND ASSIGNS INFORMATION WHICH IDENTIFIES APPLICATIONS

[75] Inventor: Yasushi Sasagawa, Kanagawa, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/597,648

[22] Filed: Feb. 6, 1996

[30] Foreign Application Priority Data

Feb. 10, 1995 [JP] Japan ................................. 7-022775
Aug. 31, 1995 [JP] Japan ................................. 7-223515

[51] Int. Cl.$^6$ .......................... H04L 12/28; H04L 12/56; H04L 12/66; H04J 3/24
[52] U.S. Cl. ............................ 370/395; 370/474; 370/463
[58] Field of Search ................................. 370/230, 231, 370/235, 236, 261, 463, 905, 395–399, 474

[56] References Cited

U.S. PATENT DOCUMENTS

| | | | |
|---|---|---|---|
| 5,452,293 | 9/1995 | Wilkinson | 370/54 |
| 5,535,338 | 7/1996 | Krause | 370/463 |
| 5,572,518 | 11/1996 | Takama | 370/58.1 |

FOREIGN PATENT DOCUMENTS 1298850 12/1989 Japan .
4192747 7/1992 Japan .

OTHER PUBLICATIONS

W.J. Goralski, "Introduction to ATM Networking," McGraw–Hill, pp. 213–216, 1995.
T.M. Chen et al., "ATM Switching Systems," Artech House, pp. 182–187, 1995.
U. Black, "ATM Foundation for Broadband Networks," Prentice–Hall, pp. 241–275, 1995.
T.M. Chen et al., "ATM Switching Systems," Artech House, p. 204, Feb. 1995.
ITU–T Draft Rec. Q.2931, B–ISDN Access Signalling System DSS2 (Digital Subscriber Signaling System No. 2), Geneva, Dec. 1993.

*Primary Examiner*—Douglas W. Olms
*Assistant Examiner*—David R Vincent
*Attorney, Agent, or Firm*—Helfgott & Karas, P.C.

[57] ABSTRACT

ATM terminals are connected to an ATM network through a user network interface (UNI). When a connection is set between a calling side application and a called side application corresponding to an ATM signaling protocol performed by a signaling portion, and a unique sub-address that identifies an application is set to a call setting message along with a calling side terminal address and a terminating call terminal address, a plurality of connections can be securely set between a calling side application and a called side application.

12 Claims, 31 Drawing Sheets

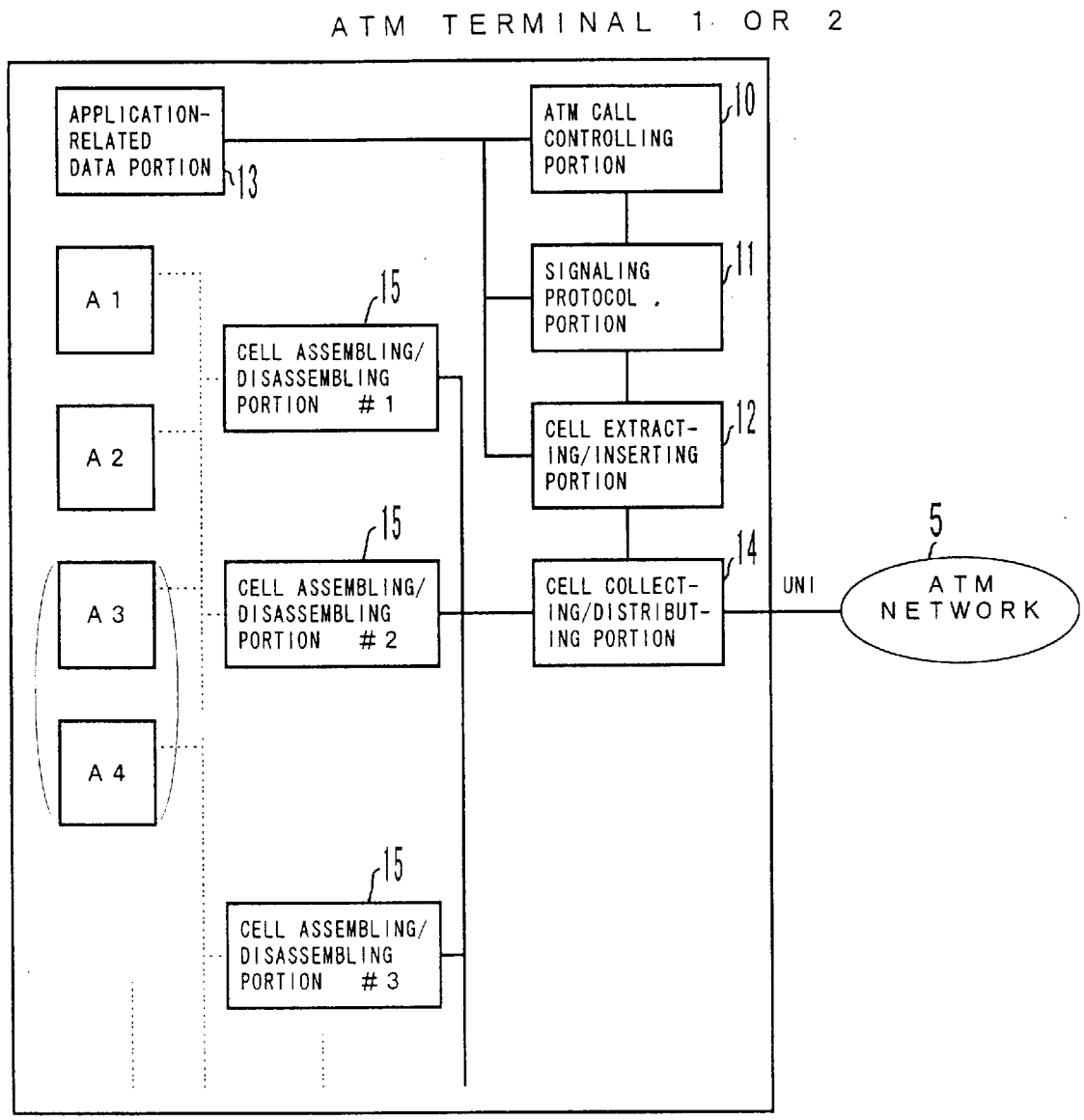
F I G. 4

SETUP

FIG. 6A

| Information element | Direction | Type | Length |
|---|---|---|---|
| (1) Protocol discriminator | both | M | 1 |
| (2) Call reference | both | M | 4 |
| (3) Message type | both | M | 2 |
| (4) Message length | both | M | 2 |
| (5) AAL parameters | both | O | 4-20 |
| (6) ATM user cell rate | both | M | 12-30 |
| (7) Broadband bearer capability | both | M | 6-7 |
| (8) Broadband high layer information | both | O | 4-13 |
| Broadband repeat indicator | both | O | 4-5 |
| (9) Broadband low layer information | both | O | 4-17 |
| (10) Called party number | both | M | 4-25 |
| (11) Called party subaddress | both | O | 4-25 |
| (12) Calling party number | both | O | 4-26 |
| (13) Calling party subaddress | both | O | 4-25 |
| (14) Connection identifier | N->U | M | 9 |
| (15) QoS parameter | both | M | 6 |
| (16) Broadband sending complete | both | O | 4-5 |
| (17) Transit network selection | U->N | O | 4-8 |

Type : { M : mandatory
        O : optional }

CONNECT

FIG. 6B

| Information element | Direction | Type | Length |
|---|---|---|---|
| (1) Protocol discriminator | both | M′ | 1 |
| (2) Call reference | both | M | 4 |
| (3) Message type | both | M | 2 |
| (4) Message length | both | M | 2 |
| (5) AAL parameters | both | O | 4-11 |
| (9) Broadband low layer information | both | O | 4-17 |
| (14) Connection identifier | both | O | 4-9 |

(1) Protocol discriminator

| 8 | 7 | 6 | bits 5 | 4 | 3 | 2 | 1 | |
|---|---|---|---|---|---|---|---|---|
| | | | Q.9231 user-network call control messages | | | | | |
| 0 | 0 | 0 | 0 | 1 | 0 | 0 | 1 | 1 |
| | | | Protocol discriminator | | | | | |

(2) Call reference

| 8 | 7 | 6 | bits 5 | 4 | 3 | 2 | 1 | |
|---|---|---|---|---|---|---|---|---|
| | | | | Length of call reference | | | | |
| 0 | 0 | 0 | 0 | 0 | 0 | 1 | 1 | 1 |
| | | | | value( in octets ) | | | | |
| flag | Call reference value | | | | | | | 2 |
| Call reference value( continued ) | | | | | | | | 3 |
| Call reference value( continued ) | | | | | | | | 4 |

(3) Message type

| 8 | 7 | 6 | bits 5 | 4 | 3 | 2 | 1 | |
|---|---|---|---|---|---|---|---|---|
| Message type | | | | | | | | 1 |
| 1 ext | 0 0 Spare | | flag | 0 Spare | 0 Spare | Action Indicator | | 2 |

(4) Message length

| 8 | 7 | 6 | bits 5 | 4 | 3 | 2 | 1 | |
|---|---|---|---|---|---|---|---|---|
| Message length | | | | | | | | 1 |
| Message length | | | | | | | | 2 |

FIG. 7

(5) ATM Adaptation Layer Parameters
(AAL Parameters)

| 8 | 7 | 6 | bits 5 | 4 | 3 | 2 | 1 | |
|---|---|---|---|---|---|---|---|---|
| 0 | 1 | 0 | ATM adaptation layer parameters Information element identifier 1 | | 0 | 0 | 0 | 1 |
| 1 ext | Coding Standard | | IE Instruction Field | | | | | 2 |
| Length of AAL parameters contents | | | | | | | | 3 - 4 |
| AAL Type | | | | | | | | 5 |
| Further content depending upon AAL type | | | | | | | | 6 |

| 1 | 0 | 0 | Subtype Identifier 0 | 0 | 1 | 0 | 1 | 6 |
|---|---|---|---|---|---|---|---|---|
| Subtype | | | | | | | | 6.1 |
| 1 | 0 | 0 | CBR Rate Identifier 0 | 0 | 1 | 1 | 0 | 7 |
| CBR Rate | | | | | | | | 7.1 |
| 1 | 0 | 0 | Multiplier Identifier 0 | 0 | 1 | 1 | 1 | 8 |
| Multiplier | | | | | | | | 8.1 - 8.2 |
| 1 | 0 | 0 | Clock Recovery Type Identifier 0 | 1 | 0 | 0 | 0 | 9 |
| Clock Recovery Type | | | | | | | | 9.1 |
| 1 | 0 | 0 | Error Correction Identifier 0 | 1 | 0 | 0 | 1 | 10 |
| Error Correction | | | | | | | | 10.1 |
| 1 | 0 | 0 | Structured Data Transfer Identifier 0 | 1 | 0 | 1 | 0 | 11 |
| Structured Data Transfer | | | | | | | | 11.1 |
| 1 | 0 | 0 | Partially Filled Cells Identifier 0 | 1 | 0 | 1 | 1 | 12 |
| Partially Filled Cells | | | | | | | | 12.1 |

(AAL TYPE 1)

FIG. 8

(6) ATM user cell rate (ATM traffic descriptor)

| 8 | 7 | 6 | bits 5 | 4 | 3 | 2 | 1 | |
|---|---|---|---|---|---|---|---|---|
| 0 | 1 | 0 | ATM user cell rate<br>1  1  0<br>Information element identifier | | | 0 | 1 | 1 |
| 1<br>ext | Coding<br>Standard | | IE Instruction Field | | | | | 2 |
| Length of ATM user cell rate contents | | | | | | | | 3<br>-<br>4 |
| 1 | 0 | 0 | 0 | 0 | 0 | 1 | 0 | 5 |
| Forward peak cell rate identifier ( CLP=0 ) | | | | | | | | |
| Forward peak cell rate | | | | | | | | 5.1<br>-<br>5.3 |
| 1 | 0 | 0 | 0 | 0 | 0 | 1 | 1 | 6 |
| Backward peak cell rate identifier ( CLP=0 ) | | | | | | | | |
| Backward peak cell rate | | | | | | | | 6.1<br>-<br>6.3 |
| 1 | 0 | 0 | 0 | 0 | 1 | 0 | 0 | 7 |
| Forward peak cell rate identifier ( CLP=0+1 ) | | | | | | | | |
| Forward peak cell rate | | | | | | | | 7.1<br>-<br>7.3 |
| 1 | 0 | 0 | 0 | 0 | 1 | 0 | 1 | 8 |
| Backward peak cell rate identifier ( CLP=0+1 ) | | | | | | | | |
| Backward peak cell rate | | | | | | | | 8.1<br>-<br>8.3 |
| 1 | 0 | 0 | 0 | 1 | 0 | 0 | 0 | 9 |
| Forward sustainable cell rate identifier ( CLP=0 ) | | | | | | | | |
| Forward sustainable cell rate | | | | | | | | 9.1<br>-<br>9.2 |
| 1 | 0 | 0 | 0 | 1 | 0 | 0 | 1 | 10 |
| Backward sustainable cell rate identifier ( CLP=0 ) | | | | | | | | |
| Backward sustainable cell rate | | | | | | | | 10.1<br>-<br>10.3 |

| | | | | | | | | |
|---|---|---|---|---|---|---|---|---|
| 1 | 0 | 0 | 1 | 0 | 0 | 0 | 0 | 11 |
| | | Forward sustainable cell rate identifier( CLP=0+1 ) | | | | | | |
| Forward sustainable cell rate | | | | | | | | 11.1 – 11.3 |
| 1 | 0 | 0 | 1 | 0 | 0 | 0 | 1 | 12 |
| | | Backward sustainable cell rate identifier( CLP=0+1 ) | | | | | | |
| Backward sustainable cell rate | | | | | | | | 12.1 – 12.3 |
| 1 | 0 | 1 | 0 | 0 | 0 | 0 | 0 | 13 |
| | | Forward maximum burst size identifier( CLP=0 ) | | | | | | |
| Forward maximum burst size | | | | | | | | 13.1 – 13.3 |
| 1 | 0 | 1 | 0 | 0 | 0 | 0 | 1 | 14 |
| | | Backward maximum burst size identifier( CLP=0 ) | | | | | | |
| Backward maximum burst size | | | | | | | | 14.1 – 14.3 |
| 1 | 0 | 1 | 1 | 0 | 0 | 0 | 0 | 15 |
| | | Forward maximum burst size identifier( CLP=0+1 ) | | | | | | |
| Forward maximum burst size | | | | | | | | 15.1 – 15.3 |
| 1 | 0 | 1 | 1 | 0 | 0 | 0 | 1 | 16 |
| | | Backward maximum burst size identifier( CLP=0+1 ) | | | | | | |
| Backward maximum burst size | | | | | | | | 16.1 – 16.3 |
| 1 | 0 | 1 | 1 | 1 | 1 | 1 | 0 | 17 |
| | | Best effort indicator | | | | | | |
| 1 | 0 | 1 | 1 | 1 | 1 | 1 | 1 | 18 |
| | | Traffic management options identifier | | | | | | |
| 0 | 0 | 0 | 0 | 0 | 0 | 1 Tagging backward | 1 Tagging forward | 19 |
| | | Reserved | | | | | | |

F I G. 10

(7) Broadband bearer capability

| 8 | 7 | 6 | bits 5 | 4 | 3 | 2 | 1 | |
|---|---|---|---|---|---|---|---|---|
| 0 | 1 | 0 | 1 | 1 | 1 | 1 | 0 | 1 |
| \multicolumn{8}{|c|}{Broadband bearer capability Information element identifier} | |
| 1 ext | Coding Standard | | IE Instruction Field | | | | | 2 |
| \multicolumn{8}{|c|}{Length of B-BC contents} | 3 - 4 |
| 0/1 ext | 0 Spare | 0 | Bearer class | | | | | 5 |
| 1 ext | 0 Spare | 0 | Traffic type | | | Timing requirements | | 5a |
| 1 ext | Susceptibility to clipping | | 0 Spare | 0 | 0 | User plane connection configuration | | 6 |

Table above combined; rewriting cleanly:

| 8 | 7 | 6 | 5 | 4 | 3 | 2 | 1 | byte |
|---|---|---|---|---|---|---|---|---|
| 0 | 1 | 0 | 1 | 1 | 1 | 1 | 0 | 1 |
| 1 ext | Coding Standard | | IE Instruction Field | | | | | 2 |
| Length of B-BC contents | | | | | | | | 3-4 |
| 0/1 ext | 0 Spare | 0 | Bearer class | | | | | 5 |
| 1 ext | 0 Spare | 0 | Traffic type | | | Timing requirements | | 5a |
| 1 ext | Susceptibility to clipping | | 0 Spare | 0 | 0 | User plane connection configuration | | 6 |

Byte 1: Broadband bearer capability Information element identifier (8) Broadband high layer information

| 8 | 7 | 6 | 5 | 4 | 3 | 2 | 1 | byte |
|---|---|---|---|---|---|---|---|---|
| 0 | 1 | 0 | 1 | 1 | 1 | 0 | 1 | 1 |
| 1 ext | Coding Standard | | IE Instruction Field | | | | | 2 |
| Length of B-HLI contents | | | | | | | | 3-4 |
| 1 ext | High layer information type | | | | | | | 5 |
| High layer information | | | | | | | | 6-13 |

Byte 1: Broadband high layer information Information element identifier

FIG. 11

(9) Broadband low layer information

| bits 8 | 7 | 6 | 5 | 4 | 3 | 2 | 1 | |
|---|---|---|---|---|---|---|---|---|
| 0 | 1 | Broadband low layer information<br>0  1  1  1  1  1<br>Information element identifier | | | | | | 1 |
| 1<br>ext | Coding<br>Standard | | IE Instruction Field | | | | | 2 |
| Length of B-LLI contents | | | | | | | | 3<br>-<br>4 |
| 1<br>ext | 0   1<br>Layer 1 id | | User information layer 1 protocol | | | | | 5 |
| 0/1<br>ext | 1   0<br>Layer 2 id | | User information layer 2 protocol | | | | | 6 |
| 0/1<br>ext | Mode | | 0   0   0<br>Spare | | | Q.933 use | | 6a |
| 1<br>ext | Window size ( k ) | | | | | | | 6b |
| 1<br>ext | User specified layer 2 protocol information | | | | | | | 6a |
| 0/1<br>ext | 1   1<br>Layer 3 id | | User information layer 3 protocol | | | | | 7 |
| 0/1<br>ext | Mode | | 0   0   0   0   0<br>Spare | | | | | 7a |
| 0/1<br>ext | 0  ˙ 0<br>Spare | 0 | Default packet size | | | | | 7b |
| 1<br>ext | Packet window size | | | | | | | 7c |
| 1<br>ext | User specified layer 3 protocol information | | | | | | | 7a |
| 1<br>ext | ISO/IEC TR 9577 Initial protocol identifier( IPI ) | | | | | | | 7a |
| 1<br>ext | IPI<br>(bit1) | 0 | 0   0   0   0   0<br>Spare | | | | | 7b |
| 1<br>ext | 0   0<br>SNAP ID | | 0   0   0   0   0<br>Spare | | | | | 8 |

| | |
|---|---|
| OUI Octet 1 | 8.1 |
| OUI Octet 2 | 8.2 |
| OUI Octet 3 | 8.3 |
| PID Octet 1 | 8.4 |
| PID Octet 2 | 8.5 |

(10) Called party number

| 8 | 7 | 6 | bits 5 | 4 | 3 | 2 | 1 | |
|---|---|---|---|---|---|---|---|---|
| 0 | 1 | 1 | Called party number 1 0 Information element identifier | | 0 | 0 | 0 | 1 |
| 1 ext | Coding Standard | | IE Instruction Field | | | | | 2 |
| Length of called party number contents | | | | | | | | 3 - 4 |
| 1 ext | Type of number | | | Addressing/numbering plan identification | | | | 5 |
| 0 | Address/number digits( IA5 characters ) | | | | | | | 6 |
| NSAP address octets | | | | | | | | 6 |

(11) Called party subaddress

| 8 | 7 | 6 | bits 5 | 4 | 3 | 2 | 1 | |
|---|---|---|---|---|---|---|---|---|
| 0 | 1 | 1 | Called party subaddress 1 0 Information element identifier | | 0 | 0 | 1 | 1 |
| 1 ext | Coding Standard | | IE Instruction Field | | | | | 2 |
| Length of called party subaddress contents | | | | | | | | 3 - 4 |
| 1 ext | Type of subaddress | | odd/even indicator | 0 | 0 Spare | 0 | | 5 |
| Subaddress information | | | | | | | | 6 |

F I G. 13

(12) Calling party number

| bits | | | | | | | | |
|---|---|---|---|---|---|---|---|---|
| 8 | 7 | 6 | 5 | 4 | 3 | 2 | 1 | |
| Calling party number<br>Information element identifier | | | | | | | | 1 |
| 0 | 1 | 1 | 0 | 1 | 1 | 0 | 0 | |
| 1<br>ext | Coding<br>Standard | | IE Instruction Field | | | | | 2 |
| Length of calling party number contents | | | | | | | | 3<br>-<br>4 |
| 1<br>ext | Type of number | | | Addressing/numbering plan<br>identification | | | | 5 |
| 1<br>ext | Presentation<br>indicator | | 0 | 0 | 0 | Screening<br>indicator | | 5a |
| 0 | Address/number digits( IA5 characters ) | | | | | | | 6 |
| NSAP address octets | | | | | | | | 6 |

(13) Calling party subaddress

| bits | | | | | | | | |
|---|---|---|---|---|---|---|---|---|
| 8 | 7 | 6 | 5 | 4 | 3 | 2 | 1 | |
| Calling party subaddress<br>Information element identifier | | | | | | | | 1 |
| 0 | 1 | 1 | 0 | 1 | 1 | 0 | 1 | |
| 1<br>ext | Coding<br>Standard | | IE Instruction Field | | | | | 2 |
| Length of calling party subaddress contents | | | | | | | | 3<br>-<br>4 |
| 1<br>ext | Type of subaddress | | | odd/even<br>indicator | 0 | 0<br>Spare | 0 | 5 |
| Subaddress information | | | | | | | | 6 |

FIG. 14

(14) Connection identifier

| bits | | | | | | | | |
|---|---|---|---|---|---|---|---|---|
| 8 | 7 | 6 | 5 | 4 | 3 | 2 | 1 | |
| Connection identifier<br>Information element identifier<br>0   1   0   1   1   0   1   0 | | | | | | | | 1 |
| 1<br>ext | Coding<br>Standard | | IE Instruction Field | | | | | 2 |
| Length of connection identifier contents | | | | | | | | 3 |
| Length of connection identifier contents (continued) | | | | | | | | 4 |
| 1<br>ext | 0   0<br>Spare | | VP Associated<br>Signalling | | Preferred/Exclusive | | | 5 |
| Virtual Path Connection Identifier | | | | | | | | 6<br>-<br>7 |
| Virtual Channel Identifier | | | | | | | | 8<br>-<br>9 |

(15) Quality of service parameter (QOS parameter)

| bits | | | | | | | | |
|---|---|---|---|---|---|---|---|---|
| 8 | 7 | 6 | 5 | 4 | 3 | 2 | 1 | |
| Quality of service parameter<br>Information element identifier<br>0   1   0   1   1   1   0   0 | | | | | | | | 1 |
| 1<br>ext | Coding<br>Standard | | IE Instruction Field | | | | | 2 |
| Length of quality of service parameter contents | | | | | | | | 3<br>-<br>4 |
| QoS Class Forward | | | | | | | | 5 |
| QoS Class Backward | | | | | | | | 6 |

FIG. 15

(16) Broadband sending complete

| 8 | 7 | 6 | bits 5 | 4 | 3 | 2 | 1 | |
|---|---|---|---|---|---|---|---|---|
| 0 | 1 | 1 | Broadband sending complete<br>0     0     0<br>Information element identifier | | | 1 | 0 | 1 |
| 1<br>ext | Coding<br>Standard | | IE Instruction Field | | | | | 2 |
| Length of broadband sending complete contents | | | | | | | | 3<br>-<br>4 |
| 1<br>ext | 0 | 1 | Broadband sending complete indication<br>0     0     0     0 | | | | 1 | 5 |

(17) Transit network selection

| 8 | 7 | 6 | bits 5 | 4 | 3 | 2 | 1 | |
|---|---|---|---|---|---|---|---|---|
| 0 | 1 | 1 | Transit network selection<br>1     1     0<br>Information element identifier | | | 0 | 0 | 1 |
| 1<br>ext | Coding<br>Standard | | IE Instruction Field | | | | | 2 |
| Length of transit network selection contents | | | | | | | | 3<br>-<br>4 |
| 1<br>ext | Type of network<br>identification | | Network identification plan | | | | | 5 |
| 0 | Network identification( IA5 characters ) | | | | | | | 6 |

FIG. 16

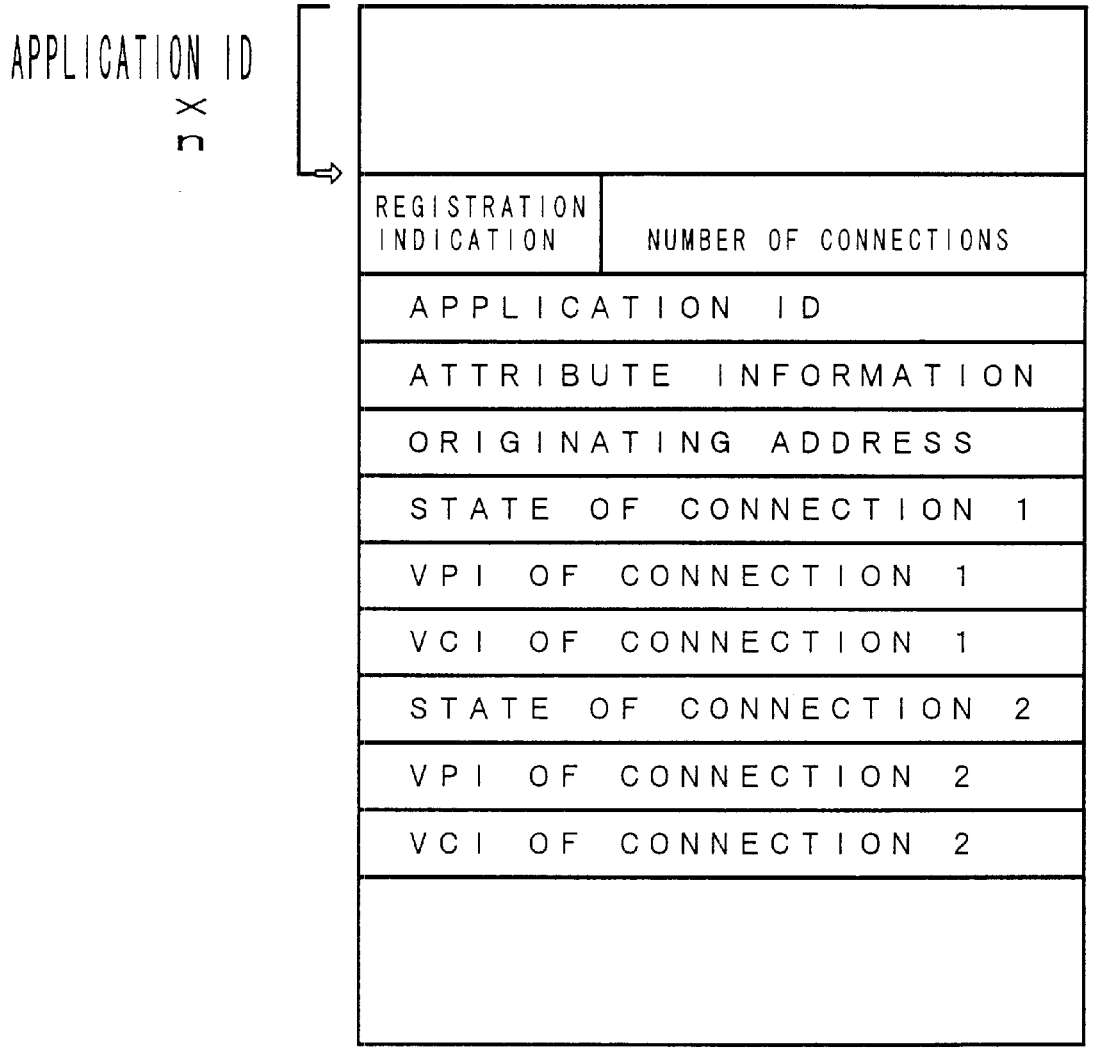
F I G. 2 1

(8) Broadband high layer Information

| bits 8 | 7 | 6 | 5 | 4 | 3 | 2 | 1 | |
|---|---|---|---|---|---|---|---|---|
| 0 | 1 | 0 | 1 | 1 | 1 | 0 | 1 | 1 |
| Broadband high layer information | | | | | | | | |
| Information element identifier | | | | | | | | |
| ext | Coding Standard | | IE Instruction Field | | | | | 2 |
| 1 | 0 | 0 | 0 | 0 | 0 | 0 | 0 | |
| 0 | 0 | 0 | 0 | 0 | 0 | 0 | 0 | 3 |
| Length of B-HLI contents | | | | | | | | |
| 0 | 0 | 0 | 0 | 0 | 0 | 1 | 0 | 4 |
| 1 ext | 0 | 0 | 0 | 0 | 0 | 0 | 1 | 5 |
| High layer information type | | | | | | | | |
| X | X | X | X | X | X | X | X | 6 |
| High layer information (APL-ID) | | | | | | | | |

← USER INTRINSIC

FIG. 24

SETUP

|     | Information element | Direction | Type | Length |
|-----|---------------------|-----------|------|--------|
| (1) | Protocol discriminator | both | M | 1 |
| (2) | Call reference | both | M | 4 |
| (3) | Message type | both- | M | 2 |
| (4) | Message length | both | M | 2 |
| (5) | AAL parameters | both | O | 4-20 |
| (6) | ATM user cell rate | both | M | 12-30 |
| (7) | Broadband bearer capability | both | M | 6-7 |
| (8) | Broadband high layer information | both | O | 4-13 |
|     | Broadband repeat indicator | both | O | 4-5 |
| (9) | Broadband low layer information | both | O | 4-17 |
| (10) | Called party number | both | M | 4-25 |
| (11) | Called party subaddress | both | O | 4-25 |
| (12) | Calling party number | both | O | 4-26 |
| (13) | Calling party subaddress | both | O | 4-25 |
| (14) | Connection identifier | N->U | M | 9 |
| (15) | QoS parameter | both | M | 6 |
| (16) | Broadband sending complete | both | O | 4-5 |
| (17) | Transit network selection | U->N | O | 4-8 |
| (18) | User data information | both | O | 4-13 ←ADDED |

FIG. 26A

CONNECT

|     | Information element | Direction | Type | Length |
|-----|---------------------|-----------|------|--------|
| (1) | Protocol discriminator | both | M | 1 |
| (2) | Call reference | both | M | 4 |
| (3) | Message type | both | M | 2 |
| (4) | Message length | both | M | 2 |
| (5) | AAL parameters | both | O | 4-11 |
| (9) | Broadband low layer information | both | O | 4-17 |
| (14) | Connection identifier | both | O | 4-9 |
| (18) | User data information | both | O | 4-13 ←ADDED |

FIG. 26B

(18) User data Information

| | 8 | 7 | 6 | 5 | 4 | 3 | 2 | 1 | |
|---|---|---|---|---|---|---|---|---|---|
| | x | x | x | x | x | x | x | x | 1 |
| | | User data information | | | | | | | |
| | | Information element identifier | | | | | | | |
| | ext | Coding Standard | | IE Instruction Field | | | | | 2 |
| | 1 | 0 | 0 | 0 | 0 | 0 | 0 | 0 | |
| | 0 | 0 | 0 | 0 | 0 | 0 | 0 | 0 | 3 |
| | | Length of U-DAT contents | | | | | | | |
| | 0 | 0 | 0 | 0 | 0 | 0 | 0 | 0 | 4 |
| | 1 ext | 0 | 0 | 0 | 0 | 0 | 1 | 1 | 5 |
| | | User data information type | | | | | | | |
| | x | x | x | x | x | x | x | x | 6 – 13 |
| | | User data information (APL-ID) | | | | | | | |

← USER INTRINSIC INFORMATION

F I G. 27

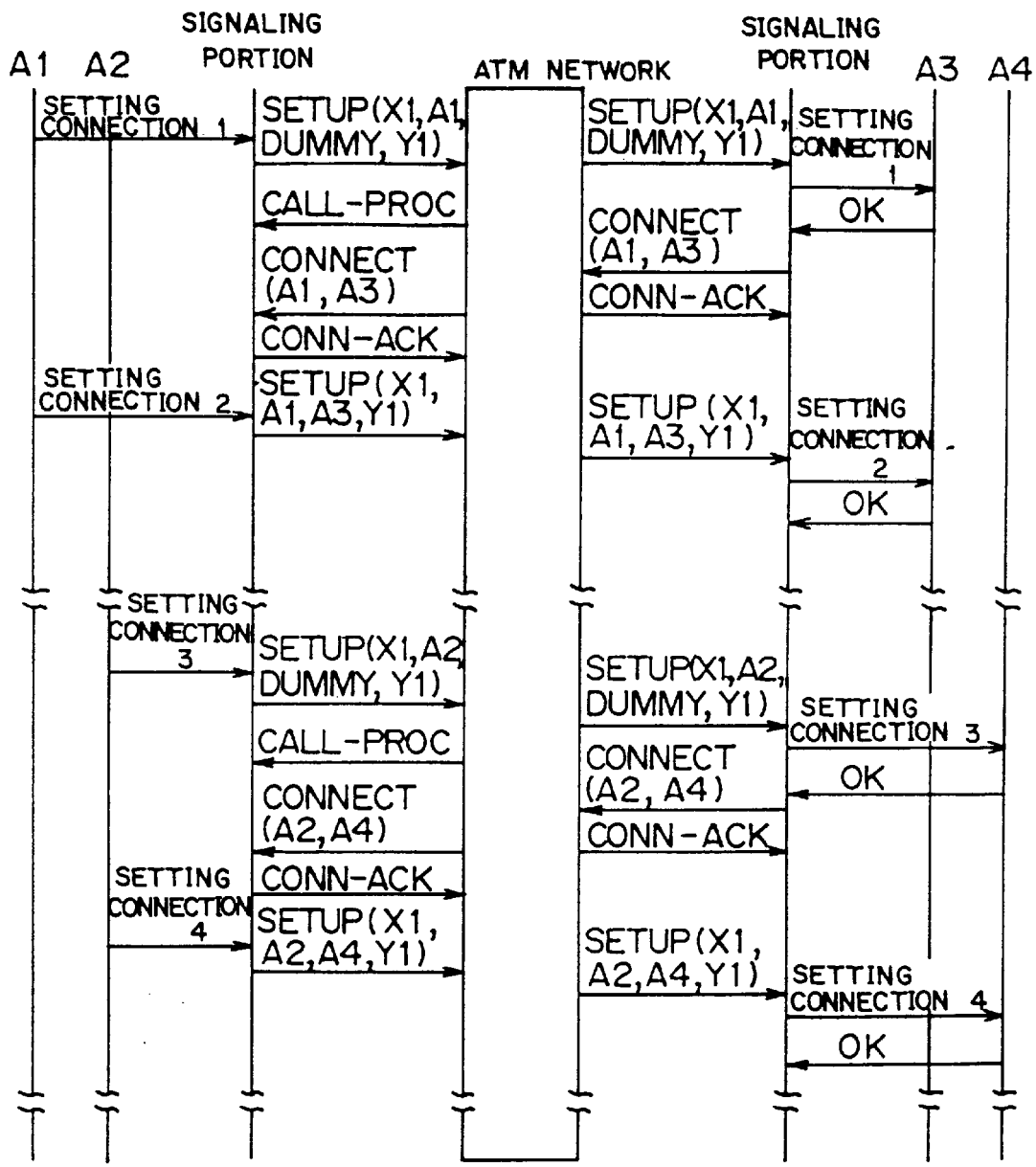
F I G. 30

METHOD FOR AN ATM NETWORK WHICH CONTROLS SETTINGS OF A PLURALITY OF CONNECTIONS AND APPARATUS AND ASSIGNS INFORMATION WHICH IDENTIFIES APPLICATIONS

BACKGROUND OF THE INVENTION

Field of the Invention

The present invention relates to a method for controlling settings of a plurality of connections for use with a switch system for setting a plurality of connections on one line and an apparatus thereof.

Description of the Related Art

A plurality of connections may be set to one application, as in a television conference system, using a switched virtual channel (SVC) service for use with an asynchronous transmission mode (ATM) system. In addition, each of a plurality of applications may be mutually connected to a plurality of other applications through one user network interface (UNI). In reality, since a television conference system or the like uses sound communication and picture communication at the same time, connections for both are required. In such a connection structure, a system for easily and properly setting a plurality of connections is desired.

FIG. 1 is a schematic diagram for explaining a first setting structure of a plurality of connections.

In FIG. 1, an ATM network 105 accommodates ATM terminals 101 and 102 that have respective addresses and that are connected by respective user network interfaces (UNIs). In the SVC service, signaling portions 103 and 104 set a pair of connections CN1 and CN2 between applications A1 and A3 and a pair of connections CN3 and CN4 between applications A2 and A4.

In the setting structure shown in FIG. 1, since the ATM terminals 101 and 102 have respective addresses, the signaling portions 103 and 104 can connect the ATM terminals 101 and 102 through the ATM network 105. For example, the connection CN1 may be set between the application A1 executed by the ATM terminal 101 and the application A3 executed by the ATM terminal 102.

However, with only the addresses of the ATM terminals 101 and 102, respective applications executed by the terminals cannot be identified. Thus, the connection CN2 other than the connection CN1 may not be newly set between the applications A1 and A3 by a new calling operation. Likewise, the connections CN3, CN4, and so forth may not be newly set between the applications A2 and A4 that are the same type as the above-described applications and that are independently activated.

FIG. 2 is a schematic diagram for explaining a conventional second setting structure of a plurality of connections.

In FIG. 2, an ATM network 205 accommodates cell assembling/disassembling units (CLADs) 201 and 202 connected by user network interfaces (UNIs). The cell assembling/disassembling units 201 and 202 accommodate terminals 206 to 209.

The cell assembling/disassembling units 201 and 202 divide data received from each of the terminals 206 to 209 by every 48 bytes and add a header portion of five bytes to each of the divided data so as to generate cells. The cells are sent to the ATM network 205. The cells are sent from the ATM network 205 to the cell assembling/disassembling units 202 and 201. The cell assembling/disassembling units 202 and 201 assemble the cells into original data. The assembled data is sent to the terminals 206 to 209.

The cell assembling/disassembling units 201 and 202 have signaling portions 203 and 204 that set connections corresponding to an ATM signaling protocol. As with the structure shown in FIG. 1, a pair of connections CN1 and CN2 and a pair of connections CN3 and CN4 are set between the terminals 206 and 208 and between the terminals 207 and 209, respectively.

In the second conventional structure shown in FIG. 2, the cell assembling/disassembling units 201 and 202 accord with the ATM terminals 101 and 102 shown in FIG. 1. The terminals 206 to 209 accord with the applications A1 to A4 shown in FIG. 1. However, with the addresses assigned to the cell assembling/disassembling units 201 and 202, a plurality of connections (for example, CN1 and CN2) may not be securely set between the terminals 206 and 208. Likewise, a plurality of connections (for example, CN3 and CN4) may not be securely set between the terminals 207 and 209.

SUMMARY OF THE INVNETION

The present invention is made from the above-described point of view. An object of the present invention is to securely set a plurality of connections between applications or terminals.

The present invention is a method or apparatus for controlling settings of a plurality of connections to at least one user network interface for allowing a switch network to accommodate a plurality of applications or a plurality of terminals.

A first aspect of the present invention comprises the steps of assigning a unique sub-address to each of the applications or each of the terminals, setting sub-addresses of calling side applications or calling side terminals and sub-addresses of called side applications or called side terminals, to a call setting message and sending the call setting message to the user network interface, and setting at least one connection between a calling side application and a called side application or between a calling side terminal and a called side terminal corresponding to the sub-addresses, through the user network interface.

According to the first aspect of the present invention, since a plurality of applications or a plurality of terminals can be identified with unique identifiers, at least one connection can be easily set between a calling side application and a called side application or between a calling side terminal and a called side terminal.

A second aspect of the present invention comprises the steps of setting application identification information or terminal identification information to a broadband high layer information element included in a call setting message and sending the call setting message to the user network interface, and setting at least one connection between a calling side application and a called side application or between calling side terminal and a called side terminal corresponding to the application identification information or the terminal identification information, through the user network interface.

According to the second aspect of the present invention, since an application or a terminal can be securely retrieved on a calling side and a called side corresponding to application identification information or terminal identification information, a plurality of connections can be securely set between the calling side and the called side.

A third aspect of the present invention comprises the steps of defining an information element included in a call setting message and a reply message received from a first called side in a normal sequence, the information element being end-to-end transparent data and definable end-to-end, setting application identification information or terminal identification information on a calling side, a called side, or a calling side and a called side, to the information element in the call setting message or the reply message, and sending the call setting message or the reply message to the user network interface, and setting at least one connection between a calling side application and a called side application or between calling side terminal and a called side terminal corresponding to the application identification information or the terminal identification information on the calling side, the called side, or the calling side and the called side, through the user network interface.

According to the third aspect of the present invention, since application identification information or terminal identification information is stored in an information element newly defined in a call setting message or a reply message, as with the second aspect of the present invention, the address resource can be effectively used. In addition, since connection setting information can be sent from the calling side to the called side and from the called side to the calling side, connections can be flexibly set.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 4 is a block diagram showing an ATM terminal;

FIG. 6A is a table showing a data format of a SETUP message;

FIG. 6B is a table showing a data format of a CONNECT message;

FIGS. 7 to 16 are schematic diagrams showing detailed data formats of information elements;

FIG. 21 is a schematic diagram showing a table structure of a called side application-related data portion 13;

FIG. 24 is a schematic diagram showing a data structure of a "(8) Broadband high layer information" element according to the second preferred embodiment of the present invention;

FIG. 26A is a table showing a data format of a SETUP message according to a third preferred embodiment of the present invention;

FIG. 26B is a table showing a data format of a CONNECT message;

FIG. 27 is a schematic diagram showing a data structure of a "(18) User data information" element;

FIG. 30 is a schematic diagram for explaining a sequence according to a fourth preferred embodiment of the present invention.

DESCRIPTION OF THE PREFERRED EMBODIMENTS

Next, with reference to the accompanying drawings, preferred embodiments of the present invention will be described.

First Preferred Embodiment

Figure 1:
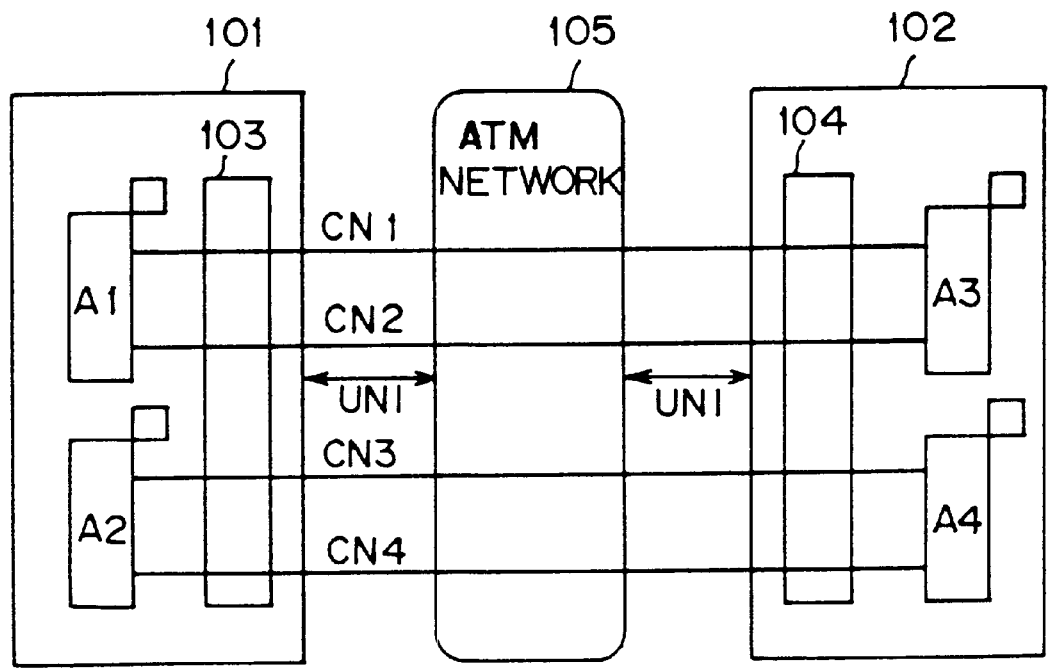
FIG. 1 is a schematic diagram for explaining a first conventional setting structure for a plurality of connections.
Figure 2:
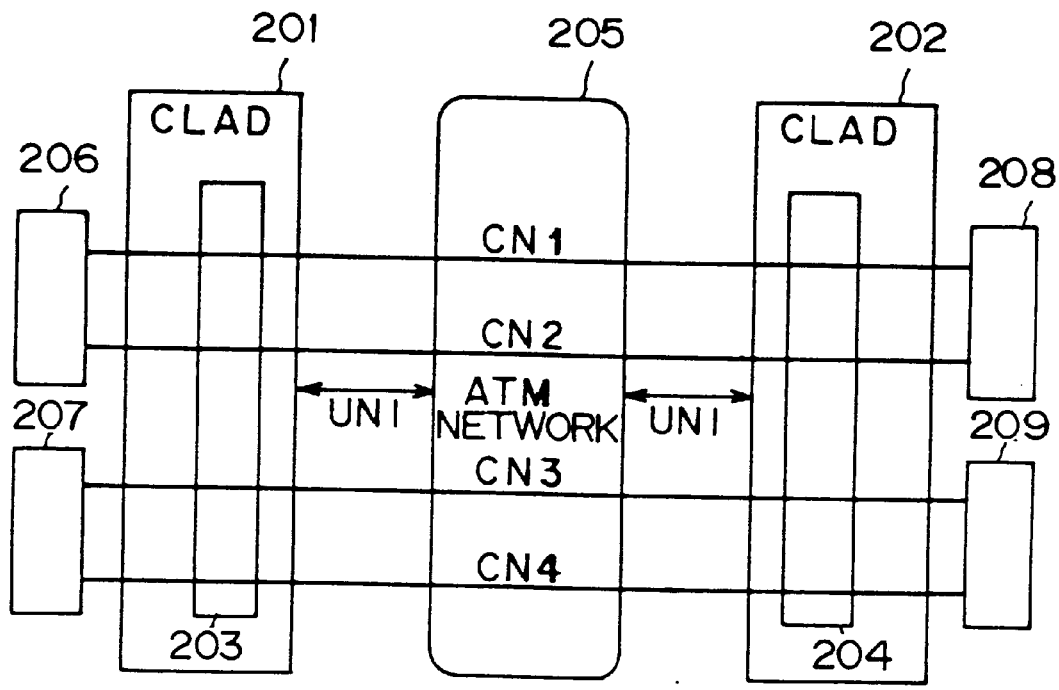
FIG. 2 is a schematic diagram for explaining a second conventional setting structure for a plurality of connections.
Figure 3:
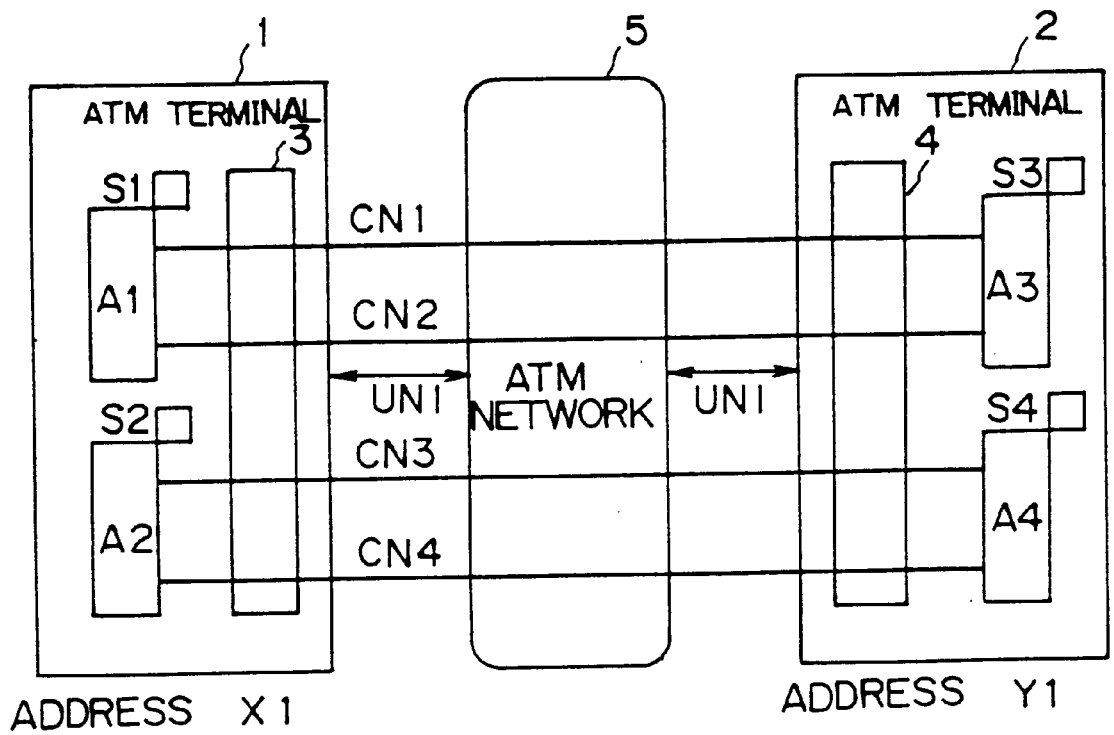
FIG. 3 is a schematic diagram for explaining a first preferred embodiment according to the present invention.

FIG. 3 is a schematic diagram for explaining a first preferred embodiment of the present invention.

ATM terminals 1 and 2 with addresses X1 and Y1 are accommodated in an ATM network 5 through respective user network interfaces (UNIs). In an SVC service, signaling portions 3 and 4 set a pair of connections CN1 and CN2 between applications A1 and A3 and a pair of connections CN3 and CN4 between applications A2 and A4, respectively. In this case, the applications A1 to A4 are assigned unique sub-addresses S1 to S4, respectively. This structure is a feature of the present invention.

FIG. 4 is a block diagram showing the ATM terminal 1 or 2.

In FIG. 4, an ATM call controlling portion 10, a signaling protocol portion 11, a cell extracting/inserting portion 12, and an application-related data portion 13 accord with the signaling portion 3 or 4 shown in FIG. 3.

The ATM call controlling portion 10 controls originating, terminating, and disconnecting of calls that use the SVC service. In addition, the ATM call controlling portion 10 executes a mapping process for mapping virtual path identifiers (VPIs)/virtual channel identifiers (VCIs) that represent virtual lines that are set as a result of such control processes with the applications A1 to A4.

The signaling protocol portion 11 terminates a layer 2 (L2) and a layer 3 (L3) of an ATM signaling protocol.

The cell extracting/inserting portion 12 extracts or inserts a signaling cell or the like.

The application-related data portion 13 stores signaling data corresponding to the applications A1 to A4.

A cell collecting/distributing portion 14 collects cells received from the applications A1 to A4 through respective cell assembling/disassembling portions 15 and sends them to the ATM network 5. In addition, the cell collecting/ distributing portion 14 distributes cells received from the ATM network 5 to the applications A1 to A4 through respective cell assembling/disassembling portions 15.

The cell assembling/disassembling portion 15 divides data received from the applications A1 to A4 by every 48 bytes and adds a header portion of five bytes to each of the divided data so as to generate cells. The cell assembling/ disassembling portion 15 sends the cells to the cell collecting/distributing portion 14. In addition, the cell assembling/disassembling portion 15 assembles the cells received from the cell collecting/distributing portion 14 into original data and sends the assembled data to the applications A1 to A4.

Figure 5:
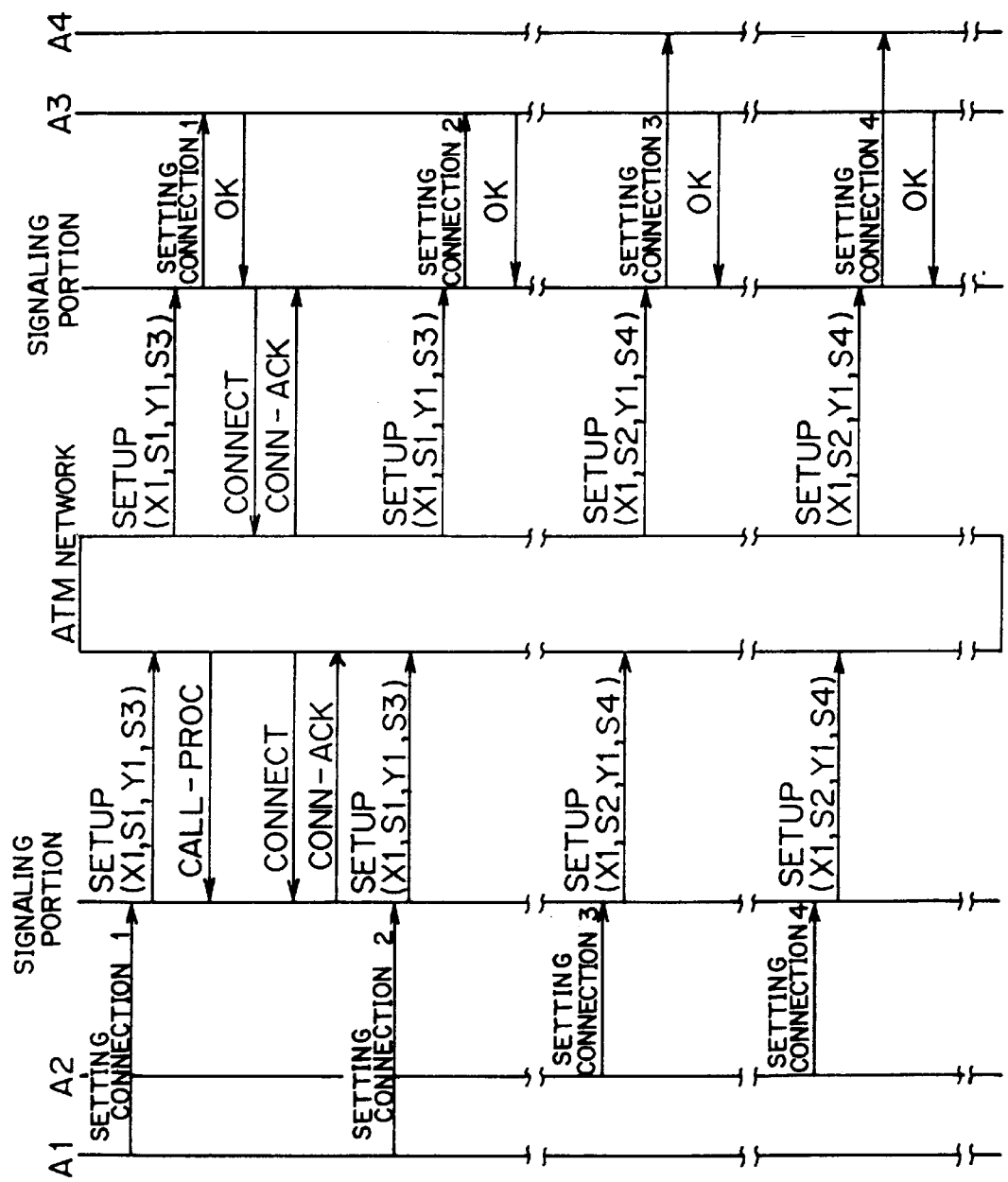
FIG. 5 is a schematic diagram for explaining a sequence according to the first preferred embodiment of the present invention.

FIG. 5 is a schematic diagram for explaining a sequence of the first preferred embodiment of the present invention.

In FIG. 5, the ATM terminal 1 is disposed on the calling side, whereas the ATM terminal 2 is disposed on the called side.

In the following description, the operation of the signaling portion 3 or 4 shown in FIG. 3 is actually executed by the ATM call controlling portion 10 shown in FIG. 4. In the following description, it is assumed that the operation executed by the ATM call controlling portion 10 is executed by the signaling portion 3 or 4.

When a connection is set from the application A1 of the ATM terminal 1 to the application A3 of the ATM terminal 2, a setting request for the connection CN1 is sent from the application A1 to the signaling portion 3.

The signaling portion 3 sets the address X1 of the calling side ATM terminal 1, the sub-address S1 of the application A1, the address Y1 of the called side ATM terminal 2, and the sub-address S3 of the application A3 to a call setting message (SETUP) and sends the call setting message (SETUP) to the ATM network 5.

The ATM network 5 sends back a call acceptance message (CALL-PROC) to the calling side ATM terminal 1 corresponding to the call setting message (SETUP) and sends the call setting message (SETUP) received from the ATM terminal 1 to the ATM terminal 2 corresponding to the address Y1 in the call setting message (SETUP).

The signaling portion 4 of the ATM terminal 2 identifies the application A3 corresponding to the sub-address S3 that is set in the call setting message (SETUP) and sends the setting request for the connection CN1 to the application A3.

At this point, when the application A3 can set a connection, it sends a permission message (OK) to the signaling portion 4.

When the signaling portion 4 receives the permission message (OK) from the application A3, the signaling portion 4 sends a reply message (CONNECT) to the ATM network 5.

When the ATM network 5 receives the reply message (CONNECT) from the ATM terminal 2, the ATM network 5 sends a reply acknowledge message (CONN-ACK) to the signaling portion 4 of the ATM terminal 2 and sends the reply message (CONNECT) to the signaling portion 3 of the ATM terminal 1.

When the signaling portion 3 of the ATM terminal 1 receives the reply message (CONNECT) from the ATM network 5, the signaling portion 3 sends a reply acknowledge message (CONN-ACK) to the ATM network 5.

As a result, the connection CN1 is set between the applications A1 and A3.

Next, the application A1 sends a setting request for the connection CN2 for the application A3 to the signaling portion 3.

The signaling portion 3 sets the address X1, the sub-address S1, the address Y1, and the sub-address S3 to a call setting message and sends the call setting message (SETUP) to the ATM network 5.

The ATM network 5 sends back a call acceptance message (CALL-PROC) to the calling side ATM terminal 1 corresponding to the call setting message (SETUP) and sends the call setting message (SETUP) received from the ATM terminal 1 to the ATM terminal 2 corresponding to the address Y1 in the call setting message (SETUP).

The signaling portion 4 of the ATM terminal 2 identifies the application A3 corresponding to the sub-address S3 in the call setting message (SETUP) and sends the setting request for the connection CN2 to the application A3.

When the application A3 can set a new connection, it sends a permission message (OK) to the signaling portion 4.

As with the case of the connection CN1, the new connection CN2 is set between the applications A1 and A3.

Thus, a plurality of connections (for example, CN1 and CN2) can be set between desired applications (for example, A1 and A3).

As with the above-described case, when a connection is set from the application A2 of the ATM terminal 1 to the application A4 of the ATM terminal 2, the application A2 sends a setting request for the connection CN3 to the signaling portion 3.

The signaling portion 3 sets the address X1 of the calling side ATM terminal 1, the sub-address S2 of the application A2, the address Y1 of the called side ATM terminal 2, and the sub-address S4 of the application A4 to a call setting message (SETUP) and sends the call setting message (SETUP) to the ATM network 5.

The ATM network 5 sends back a call acceptance message (CALL-PROC) to the calling side ATM terminal 1 corresponding to the call setting message (SETUP) and sends the call setting message (SETUP) received from the ATM terminal 1 to the ATM terminal 2 corresponding to the address Y1 in the call setting message (SETUP) to the ATM terminal 2.

The signaling portion 4 of the ATM terminal 2 identifies the application A4 corresponding to the sub-address S4 in the call setting message (SETUP) and sends the setting request for the connection CN3 to the application A4.

At this point, when the application A4 can set a connection, it sends a permission message (OK) to the signaling portion 4.

Thereafter, as with the case of the connection CN1, the connection CN3 is set between the applications A2 and A4.

Next, the application A2 sends a setting request for the new connection CN4 for the application A4 to the signaling portion 3. In this case, as with the case of the connection CN2, the new connection CN4 is set between the applications A2 and A4.

As a result, a plurality of connections can be set between an application of one ATM terminal and an application of another ATM terminal.

FIGS. 6A and 6B are tables showing examples of data formats of a call setting message (SETUP) and a reply message (CONNECT) according to the first preferred embodiment.

In "Information element" fields shown in FIGS. 6A and 6B, data elements (1) to (17) have data formats as shown in FIGS. 7 to 16.

In "Direction" fields shown in FIG. 6A and 6B, "both" represents that when data in the "Information element" is sent from the ATM terminal 1 or 2 to the ATM network 5 or vice versa, the data thereof is set to the message. "N→U" represents that only when data in the "Information element" field is sent from the ATM network 5 to the ATM terminal 1 or 2, the data thereof is set to the message. "U→N" represents that only when data of the "Information element" field is sent from the ATM terminal 1 or 2 to the ATM network 5, the data thereof is set to the message.

In "Type" fields shown in FIG. 6A and 6B, "M" represents that data of the "Information element" field is data mandatory for the message, whereas "O" represents that data of the "Information Element" field is optional for the message.

Value of "Length" fields shown in FIG. 6A and 6B represent the octet length of data of the "Information Element" fields.

Figure 17:
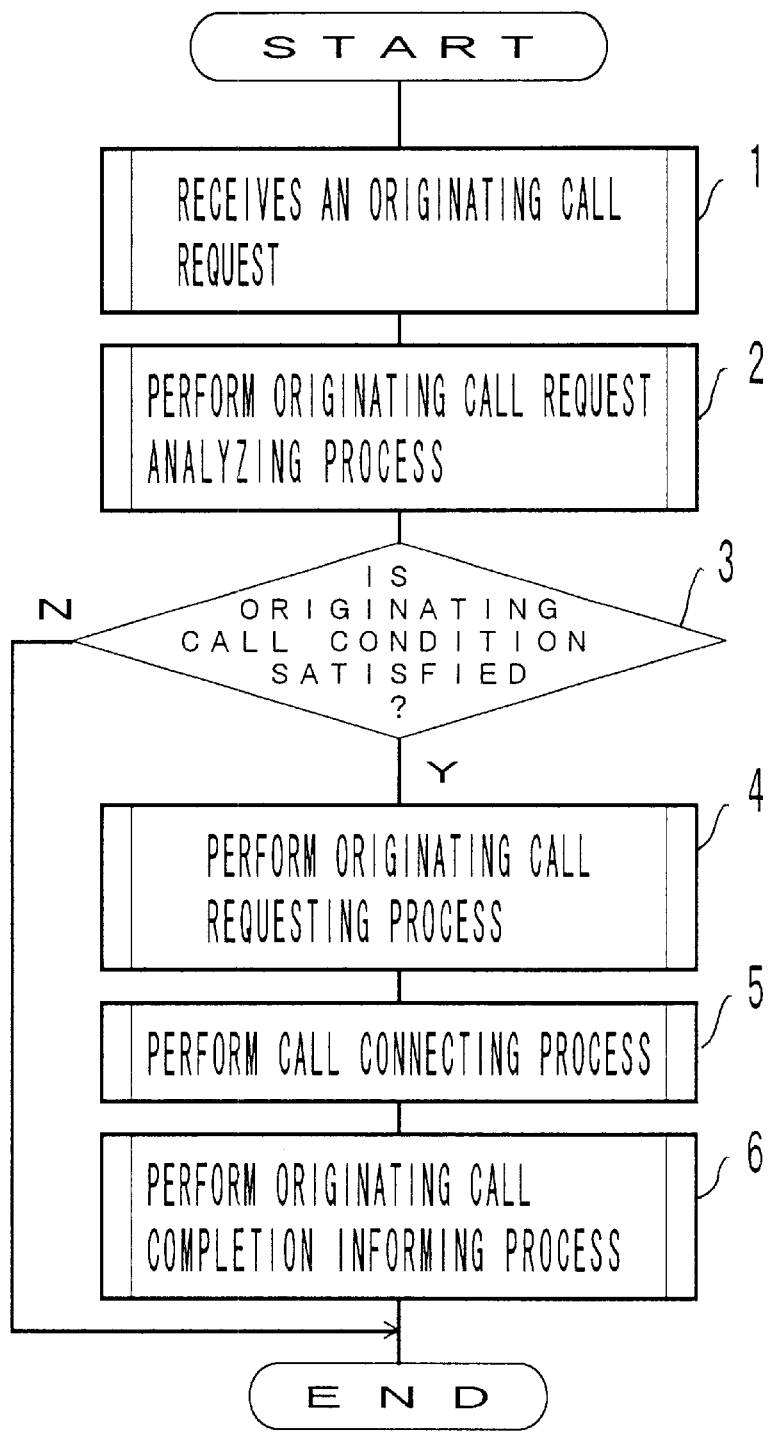
FIG. 17 is a flow chart showing an operation upon reception of an originating call request.

FIG. 17 is a flow chart showing an operation of a process executed when the ATM call controlling portion 10 (shown in FIG. 4) of the signaling portion 3 or 4 of the ATM terminal 1 or 2 shown in FIG. 3 receives a setting request for a connection (originating call request) from any application executed by the terminal 1 or 2.

At step 1, the ATM call controlling portion 10 receives an originating call request.

Figure 18:
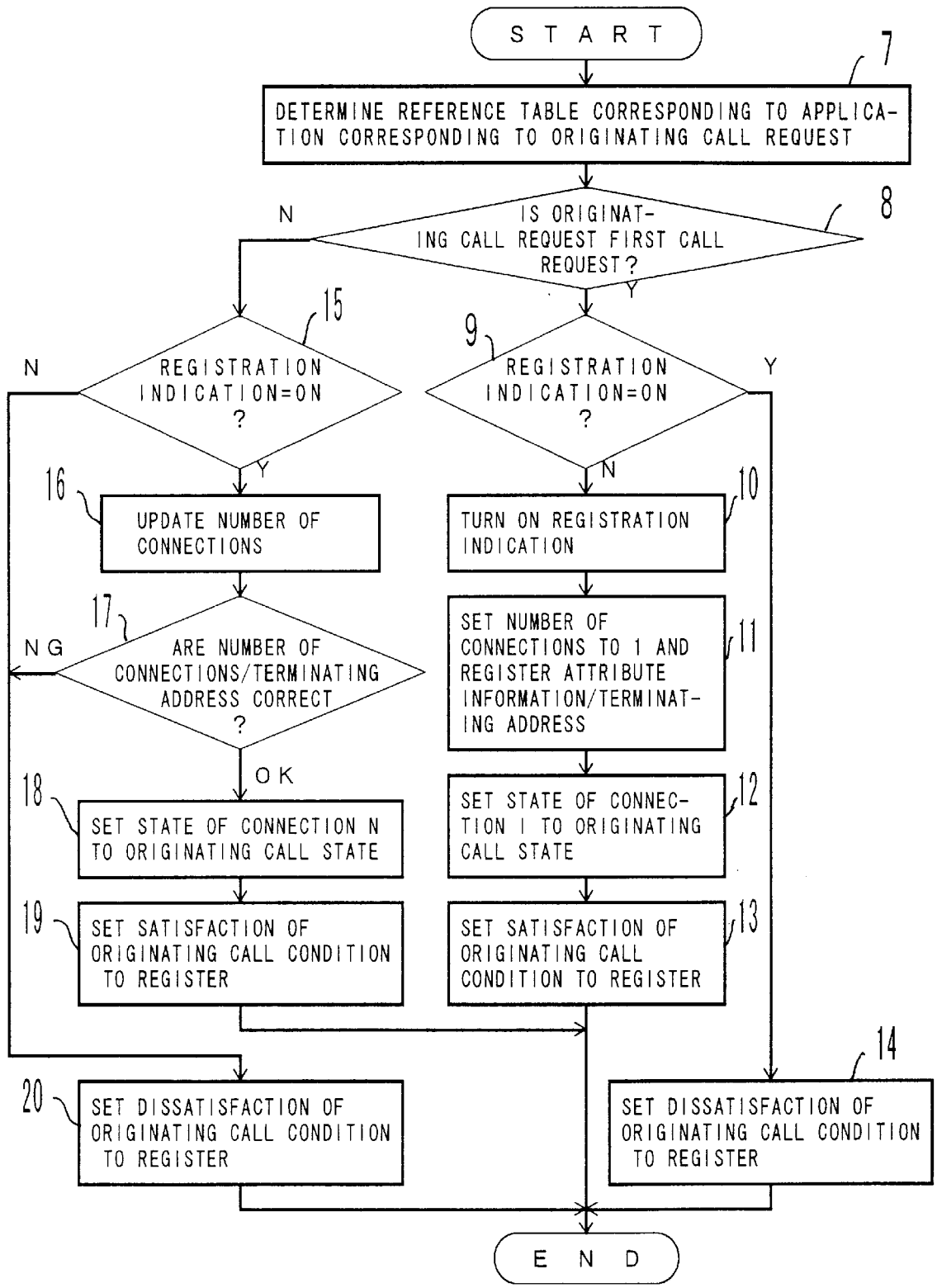
FIG. 18 is a flow chart showing an operation of an originating call request analyzing process.

Thereafter, the flow advances to step 2. At step 2, the ATM call controlling portion 10 executes an originating call request analyzing process. In this process, the ATM call controlling portion 10 references a table (stored in the application-related data portion 13 shown in FIG. 4) corresponding to an application that sends the originating call request and determines an originating call condition for the application. FIG. 18 is a flow chart showing a detailed operation of the process.

Figure 19:
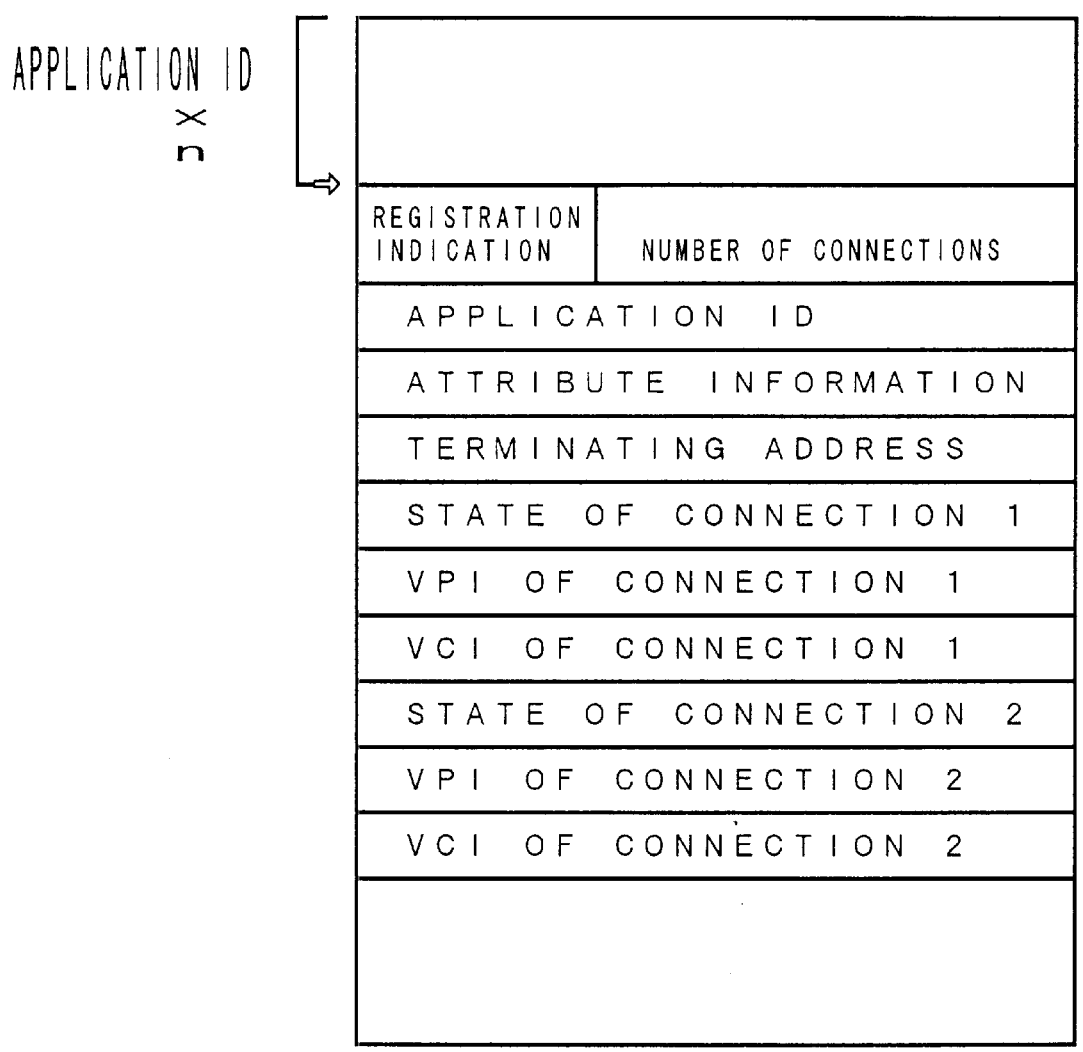
FIG. 19 is a schematic diagram showing a structure of a table of a calling side application-related data portion 13.

In FIG. 18, at step 7, the ATM call controlling portion 10 determines a table in the application-related data portion 13 (shown in FIG. 4) corresponding to an application for the originating call request. FIG. 19 shows an example of the data format of the table. In the following description, the table shown in FIG. 19 is referenced. Each application is assigned a unique application ID. The table corresponding to each application is stored at an address corresponding to an application ID assigned to the application in the application-related data portion 13.

Thereafter, the flow advances to step 8. At step 8, the ATM call controlling portion 10 determines whether or not the number of connections set on the table is 0. Thus, the ATM call controlling portion 10 determines whether or not the originating call request received from the application corresponding to the table is the first call request. The case that the originating call request is the first call request accords with, for example, the case that the setting request for the connection CN1 is sent from the application A1 to the signaling portion 3, or the case that the setting request for the connection CN3 is sent from the application A2 to the signaling portion 3, in the sequence shown in FIG. 5. In contrast, the case that the originating call request is not the first call request accords with, for example, the case that the setting request for the connection CN2 is sent from the application A1 to the signaling portion 3 or the case that the setting request for the connection CN4 is sent from the application A2 to the signaling portion 3, in the sequence shown in FIG. 5.

When the originating call request received from the application corresponding to the table is the first call request and thereby the determined result at step 8 is YES (Y), the flow advances to step 9. At step 9, the ATM call controlling portion 10 determines whether or not the registration indication in the table is ON. The registration indication is turned off by a particular process (not shown) when all connections of the application corresponding to the table are disconnected.

Thus, when the originating call request received from the application corresponding to the table is the first call request and the registration indication is ON, an error takes place in the communication of the application. Consequently, when the determined result at step 9 is YES, the flow advances to step 14. At step 14, the ATM call controlling portion 10 sets the dissatisfaction of the originating call condition to an originating call condition determining register thereof. The state of the register is determined at step 3 shown in FIG. 17.

On the other hand, when the determined result at step 9 is NO, the flow advances to step 10. At step 10, the ATM call controlling portion 10 turns on the registration indication.

Thereafter, the flow advances to step 11. At step 11, the ATM call controlling portion 10 sets the number of connections in the table to 1 and registers attribute information and a terminating address to the table. As the attribute information, a protocol type and so forth in the communication state are registered.

Thereafter, the flow advances to step 12. At step 12, the ATM call controlling portion 10 sets the state of the connection 1 in the table to the originating call state.

Thereafter, the flow advances to step 13. At step 13, the ATM call controlling portion 10 sets the satisfaction of the originating call condition to the originating call condition determining register thereof.

On the other hand, when the originating call request received from the application corresponding to the table is not the first call request and thereby the determined result at step 8 is NO (N), the flow advances to step 15. At step 15, the ATM call controlling portion 10 determines whether or not the registration indication set in the table is ON. As described above, the registration indication is turned on at step 10 when the first connection of the application corresponding to the table is set.

Thus, when the originating call request received from the application corresponding to the table is not the first call request and the registration indication is not ON, an error takes place in the communication of the application. Consequently, when the determined result at step 15 is NO, the flow advances to step 20. At step 20, the ATM call controlling portion 10 sets the dissatisfaction of the originating call condition to the originating call condition determining register thereof.

On the other hand, when the determined result at step 15 is YES, the flow advances to step 16. At step 16, the ATM call controlling portion 10 updates (increments by 1) the number of connections on the table.

Thereafter, the flow advances to step 17. At step 17, the ATM call controlling portion 10 determines the number of connections set on the table and the terminating address.

When the number of connections set on the table exceeds the number of connections that can be processed by the application, or the terminating address is abnormal, and thereby the determined result at step 17 is NG, the flow advances to step 20. At step 20, the ATM call controlling portion 10 sets the dissatisfaction of the originating call condition to the originating call condition determining register thereof.

On the other hand, when the number of connections set on the table or the terminating address is normal, and thereby the determined result at step 17 is OK, the flow advances to step 18. At step 18, the ATM call controlling portion 10 sets the state of the connection n on the table to the originating call state (when the present originating call request is the second call request, n is 2, and so forth).

Thereafter, the flow advances to step 19. At step 19, the ATM call controlling portion 10 sets the satisfaction of the originating call condition to the originating call condition determining register thereof.

Next, returning to FIG. 17, at step 2, the ATM call controlling portion 10 determines the originating call condition of the application corresponding to the originating call request. Thereafter, the flow advances to step 3. At step 3, the ATM call controlling portion 10 determines whether or not the originating call condition corresponding to the originating call request is satisfied corresponding to the value of the above-described originating call condition determining register.

When the originating call condition corresponding to the originating call request is not satisfied and thereby the determined result at step 3 is NO, the ATM call controlling portion 10 rejects the originating call request.

On the other hand, when the originating call condition corresponding to the originating call request is satisfied and the determined result at step 3 is YES, the flow advances to step 4. At step 4, the ATM call controlling portion 10 executes an originating call requesting process. In this process, the ATM call controlling portion 10 generates information for originating the call corresponding to the originating call request. Thereafter, the ATM call controlling portion 10 causes the signaling protocol portion 11 shown in FIG. 4 to send the call setting message (SETUP) to the ATM network 5 corresponding to the generated information.

In this case, the signaling protocol portion 11 sets the address X1 of the calling side ATM terminal 1 to an "Address/number digits (IA5 characters)" field or an "NSAP address octets" field (shown in FIG. 14 (12)) of a "Calling party number (12)" element of the call setting message (SETUP) shown in FIG. 6A corresponding to a command received from the ATM call controlling portion 10. In addition, the signaling protocol portion 11 sets the sub-address of the application of the calling side ATM terminal 1 to a "Subaddress information" field (shown in FIG. 14 (13)) of a "Calling party Subaddress (13)" element of the call setting message (SETUP) shown in FIG. 6A. Moreover, the signaling protocol portion 11 sets the address Y1 of the called side ATM terminal 2 to an "Address/number digits (IA5 characters)" field or an "NSAP address octets" field (shown in FIG. 13 (10)) of a "Called party number (10)" element of the call setting message (SETUP) shown in FIG. 6A. The signaling protocol portion 11 sets the sub-address of the application of the called side ATM terminal 2 to a "Subaddress information" field (shown in FIG. 13 (11)) of the "Called party subaddress (11)" of the call setting message (SETUP) shown in FIG. 6A.

In addition, the signaling protocol portion 11 sets a unique call reference value corresponding to the originating call request to a "Call reference value" field (shown in FIG. 7 (2)) of a "Call reference (2)" element of the call setting message (SETUP) shown in FIG. 6A. The call reference value is set so as to identify a call controlling message for each call.

The signaling protocol portion 11 sets general data to the call setting message (SETUP) and stores the call setting message (SETUP) to an ATM cell with particular VPI/VCI values for controlling a call. Thereafter, the signaling protocol portion 11 sends the ATM cell to the ATM network 5 through the cell extracting/inserting portion 12 and the cell collecting/distributing portion 14 (shown in FIG. 4).

Thus, as described in the sequence shown in FIG. 5, the call setting message (SETUP) having the address X1 or Y1 of the calling side ATM terminal 1 or 2, the sub-address of the application, the address Y1 or Xl of the called side ATM terminal 2 or 1, and the sub-address of the application, is set to the ATM network 5.

Thereafter, as described in the sequence shown in FIG. 5, when the ATM call controlling portion 10 of the calling side ATM terminal 1 or 2 receives the reply message (CONNECT) from the ATM network 5 through the cell collecting/distributing portion 14, the cell extracting/inserting portion 12, and the signaling protocol portion 11, the ATM call controlling portion 10 executes a call connecting process at step 5 shown in FIG. 17.

In this process, the ATM call controlling portion 10 detects a call reference value in the "Call reference value" field (shown in FIG. 7 (2)) of a "Call reference (2)" element of the reply message (CONNECT) shown in FIG. 6B and determines an application and a connection corresponding to the reply message (CONNECT) that the application has sent back. Thus, the ATM call controlling portion 10 determines a table (shown in FIG. 19) in the application-related data portion 13 (shown in FIG. 4).

Next, the ATM call controlling portion 10 of the calling side ATM terminal 1 or 2 changes the state of the connection n of the table from the originating call state to the communicating state.

In addition, the ATM call controlling portion 10 registers a VPI value stored in a "Virtual path connection identifier" field and a VCI value stored in a "Virtual channel identifier" field (shown in FIG. 15 (14)) of a "Connection identifier (14)" element of the reply message (CONNECT) shown in FIG. 6B as a connection nVPI and a connection nVCI of the table, respectively. Thereafter, the application corresponding to the table communicates the connection n with an ATM cell that has the above-described VPI/VCI.

Thereafter, the flow advances to step 6 shown in FIG. 17. At step 6, the ATM call controlling portion 10 of the calling side ATM terminal 1 or 2 executes an originating call completion informing process. In this process, as described above in the sequence shown in FIG. 5, the ATM call controlling portion 10 sends a reply acknowledge message (CONN-ACK) with the same call reference value as that included in the reply message (CONNECT) to the ATM network 5 through the signaling protocol portion 11, the cell extracting/inserting portion 12, and the cell collecting/distributing portion 14. Thus, the ATM network 5 can acknowledge that the call was established.

Figure 20:
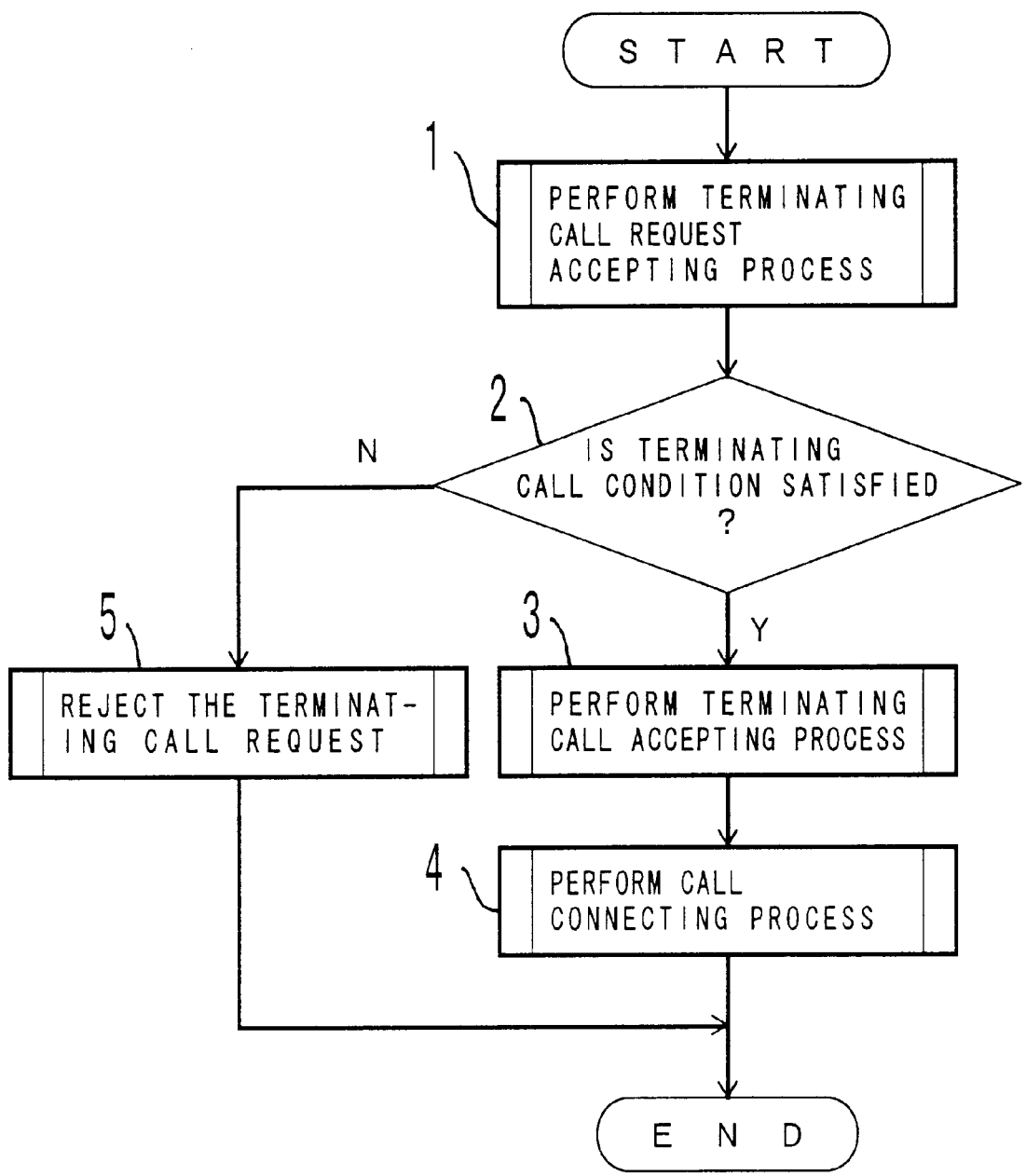
FIG. 20 is a flow chart showing an operation in a terminating call state.

FIG. 20 is a flow chart showing an operation of a process executed when the ATM call controlling portion 10 (shown in FIG. 4) of the signaling portion 3 or 4 of the called side ATM terminal 1 or 2 shown in FIG. 3 receives a call setting message (SETUP) that is a terminating call request from the ATM network 5 through the cell collecting/distributing portion 14, the cell extracting/inserting portion 12, and the signaling protocol portion 11.

At step 1 shown in FIG. 20, the ATM call controlling portion 10 executes a terminating call request accepting process.

In reality, the ATM call controlling portion 10 determines an application corresponding to a sub-address of an application of the called side ATM terminal 2. The sub-address is stored in the "Subaddress information" field (shown in FIG. 13 (11)) of the "Called party subaddress (11)" element of the call setting message (SETUP) shown in FIG. 6A. In addition, the ATM call controlling portion 10 references a table (shown in FIG. 21) stored at the address corresponding to the application ID of the application in the application-related data portion 13 shown in FIG. 4, so as to determine a terminating call condition of the application. More practically, the ATM call controlling portion 10 determines whether or not the table is actually stored in the application-related data portion 13 and whether or not the number of connections in the table exceeds the number of connections that can be processed by the application. When the determined result is OK, the ATM call controlling portion 10 sets the satisfaction of the terminating call condition to the terminating call condition determining register thereof.

In addition, the ATM call controlling portion 10 determines a required connection n and sets the state of the connection n in the table to the terminating call state. Moreover, the ATM call controlling portion 10 updates the number of connections in the table. Furthermore, the ATM call controlling portion 10 registers a VPI value stored in the "Virtual path connection identifier" field and a VCI value stored in the "Virtual channel identifier" field (shown in FIG. 15 (14)) of the "Connection identifier (14)" element of the call setting message (SETUP) (shown in FIG. 6A) received from the ATM network 5 as a connection nVPI and a connection nVCI in the table, respectively. The called side application corresponding to the table communicates with the connection n with ATM cells that have the above-described VPI/VCI.

The above-described process accords with the process by which the signaling portion 4 of the ATM terminal 2 identifies the application A3 corresponding to the sub-address S3 set in the call setting message (SETUP), the process by which the signaling portion 4 sends a setting request for the connection CN1 to the application A3, and the process by which the application A3 sends a permission message (OK) to the signaling portion 4 corresponding to the setting request in the sequence shown in FIG. 5.

Next, the flow advances to step 2 shown in FIG. 20. At step 2, the ATM call controlling portion 10 detects the value of the terminating call condition determining register corresponding to the above-described terminating call request accepting process and determines whether or not the terminating call condition is satisfied.

When the terminating call condition is not satisfied and thereby the determined result at step 2 is NO, the flow advances to step 5 shown in FIG. 20. At step 5, the ATM call controlling portion 10 rejects the terminating call request.

On the other hand, when the terminating call condition is satisfied and thereby the determined result at step 2 is YES, the flow advances to step 3. At step 3, the ATM call controlling portion 10 executes a terminating call accepting process. In this process, the ATM call controlling portion 10 generates information corresponding to the terminating call request and causes the signaling protocol portion 11 to send a reply message (CONNECT) to the ATM network 5 corresponding to the generated information.

In this case, the signaling protocol portion 11 sets a call reference value set on the calling side in the "Call reference value" field (shown in FIG. 7 (2)) of the "Call reference (2)" element of the call setting message (SETUP) shown in FIG. 6A to the "Call reference value" field (shown in FIG. 7 (2)) in the "Call reference (2)" element of the reply message (CONNECT) shown in FIG. 6B. With the call reference value, the ATM network 5 can acknowledge the reply message (CONNECT) corresponding to the call setting message that has been sent to the called side ATM terminal 1 or 2.

After the signaling protocol portion 11 sets general data to the reply message (CONNECT), it stores the reply message to an ATM cell with particular VPI/VCI values for controlling a call and sends back the ATM cell to the ATM network 5 through the cell extracting/inserting portion 12 and the cell collecting/distributing portion 14 shown in FIG. 4.

Thus, as described above in the sequence shown in FIG. 5, the called side ATM terminal 1 or 2 sends back the reply message (CONNECT) to the ATM network 5.

Thereafter, as described above in the sequence shown in FIG. 5, when the ATM call controlling portion 10 of the called side ATM terminal 1 or 2 receives a reply acknowledge message (CONN-ACK) from the ATM network 5 through the cell collecting/distributing portion 14, the cell extracting/inserting portion 12, and the signaling protocol portion 11, the ATM terminal 1 or 2 executes a call connecting process at step 4 shown in FIG. 20.

In this process, the ATM call controlling portion 10 detects a call reference value stored in the "Call reference" element in the reply acknowledge message (CONN-ACK) and determines an application and a connection corresponding to the reply acknowledge message (CONN-ACK) against the reply message (CONNECT) that the application has sent back. Thus, the ATM call controlling portion 10 determines a table (shown in FIG. 21) in the application-related data portion 13.

Next, the ATM call controlling portion 10 of the called side ATM terminal 1 or 2 changes the state of the connection n in the table from the terminating call state to the communicating state.

Thus, the called side ATM terminal 1 or 2 acknowledges the establishment of the call.

As described above, in the first preferred embodiment, when an address allocated to the ATM terminal 1 or 2 and a sub-address assigned to an application are stored in a call setting message (SETUP) and sent from the calling side ATM terminal 1 or 2 to the called side ATM terminal 1 or 2, a connection can be securely set between the calling side application and the called side application.

In the structure shown in FIGS. 3 and 4, the ATM terminals 1 and 2 are directly connected to the ATM network 5. The sequence according to the first preferred embodiment (see FIG. 5) can be applied to the structure in which the ATM network accommodates the cell assembling/disassembling units (CLADs) connected through the user network interfaces (UNIs), and each of the cell assembling/disassembling units accommodates terminals.

Figure 22:
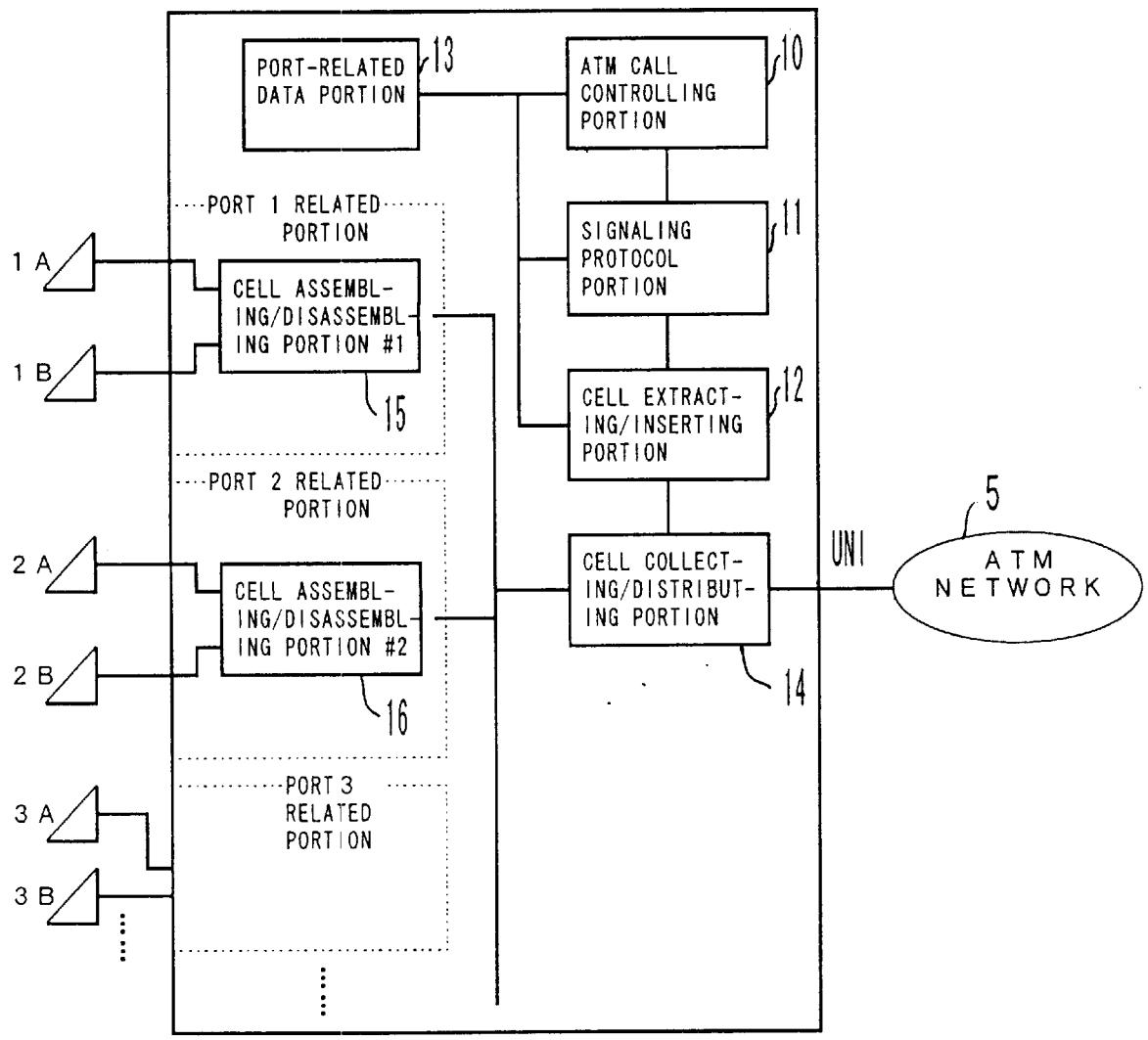
FIG. 22 is a block diagram showing a cell assembling/disassembling unit (CLAD)

FIG. 22 shows a structure of such a cell assembling/disassembling unit (CLAD). The difference between the cell assembling/disassembling unit shown in FIG. 22 and that of the ATM terminal 1 or 2 shown in FIG. 3 or 4 is in that the applications are substituted with conventional terminals (non-ATM terminals) connected to individual ports. In FIG. 22, each portion with the same reference numeral as the structure shown in FIG. 4 has the same function. The port-related data portion 13 has substantially the same function as the application-related data portion 13.

In the structure shown in FIG. 22, the same addresses as the ATM terminal 1 or 2 are assigned to the cell assembling/disassembling unit (CLAD). In addition, the same sub-addresses as the applications are assigned to the conventional terminals (non-ATM terminals). Such addresses and sub-addresses are stored in the call setting message (SETUP) and sent from a calling side terminal to a called side terminal through a calling side cell assembling/disassembling unit (CLAD) and a called side cell assembling/disassembling unit (CLAD). Thus, a connection can be securely set between the calling side terminal and the called side terminal.

Second Preferred Embodiment

Next, a second preferred embodiment of the present invention will be described.

The structure of the second preferred embodiment is the same as the structure of the first preferred embodiment shown in FIGS. 3 and 4.

In the second preferred embodiment, application IDs designating the applications A1 to A4 in FIG. 3 are denoted by the same reference numerals A1 to A4.

Unlike with a sub-address of a calling side application and a sub-address of a called side application according to the first preferred embodiment, in the second preferred embodiment, an application ID of a calling side application is set to a "Broadband high layer information" element of a call setting message (SETUP) and the resultant call setting message (SETUP) is sent.

Next, it is assumed that a setting request for a connection CN1 is sent from an application A1 of an ATM terminal 1 with an address X1 to an application A3 of an ATM terminal 2 with an address Y1.

Figure 23:
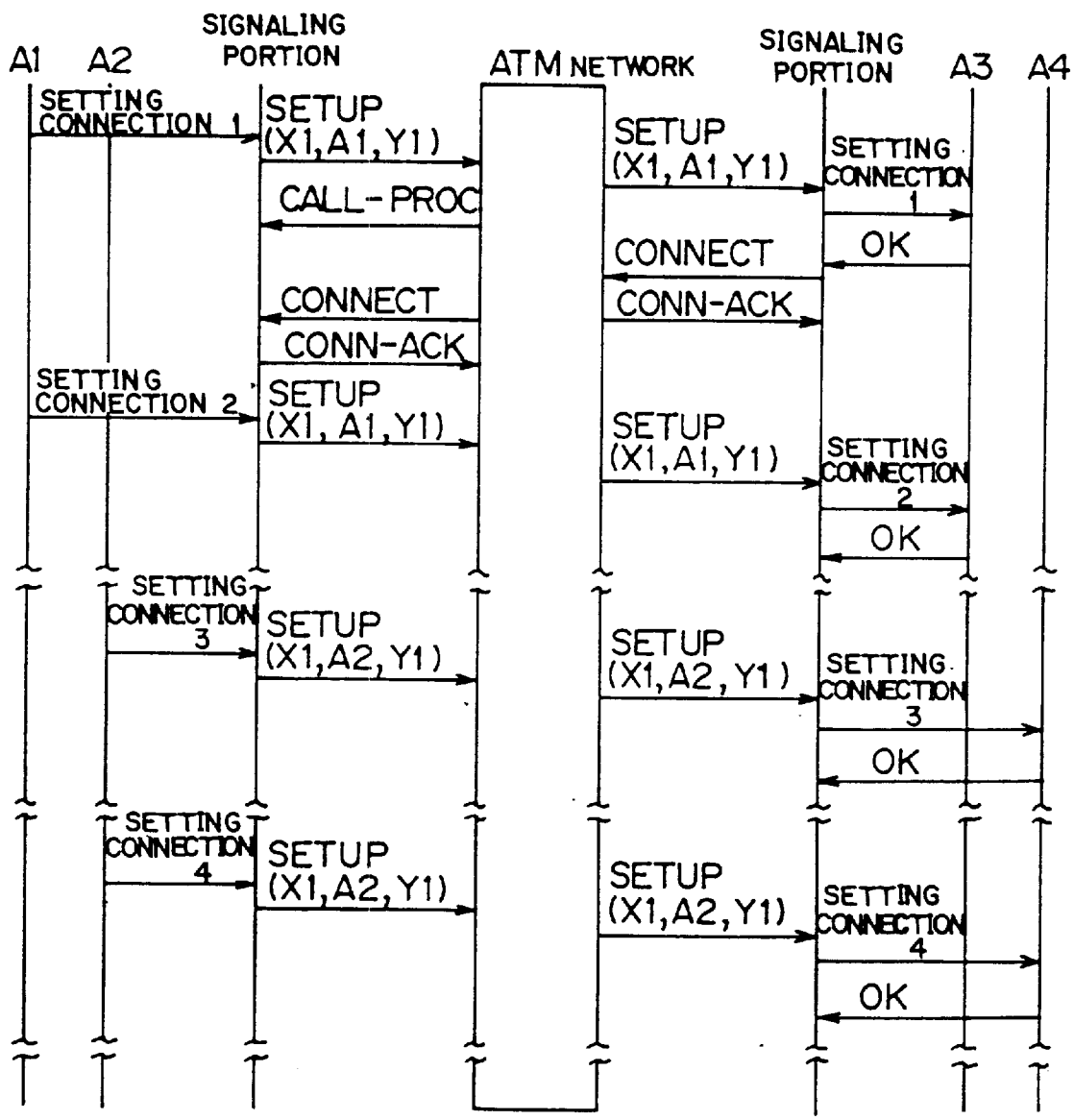
FIG. 23 is a schematic diagram for explaining a sequence according to a second preferred embodiment of the present invention.

FIG. 23 is a schematic diagram for explaining a sequence according to the second preferred embodiment of the present invention.

In the sequence shown in FIG. 23, the ATM call controlling portion 10 (shown in FIG. 4) in the signaling portion 3 of the calling side ATM terminal 1 executes a sequence of processes that is the same as that performed in the first preferred embodiment (shown in FIGS. 17 to 19) corresponding to an originating call request received from the application A1.

In the process according to step 4 shown in FIG. 17, the signaling protocol portion 11 (shown in FIG. 4) in the signaling portion 3 of the calling side ATM terminal 1 sets user intrinsic information to a "High layer information type" field (shown in FIG. 24 (8)) of a "Broadband high layer information (8)" element in the call setting message (SETUP) (shown in FIG. 6A) corresponding to a command received from the ATM call controlling portion 10. In addition, the signaling protocol portion 11 sets the application ID (APL-ID) of the calling side application A1 that has issued the originating call request to a "High layer information" field shown in FIG. 24 (8).

Moreover, the signaling protocol portion 11 sets the address X1 of the calling side ATM terminal 1 to an "Address/number digits (IA5 characters)" field or an "NSAP address octets" field (shown in FIG. 14 (12)) in the "Calling party number (12)" element of the call setting message (SETUP) (shown in FIG. 6A). In addition, the signaling protocol portion 11 sets the address Y1 of the called side ATM terminal 2 to the "Address/number digits (IA5 characters)" field or the "NSAP address octets" field (shown in FIG. 13 (10)) in the "Called party number (10)" element of the call setting message (SETUP) shown in FIG. 6A.

Furthermore, as with the case of the first preferred embodiment, the signaling protocol portion 11 sets a unique call reference value corresponding to the originating call request to the "Call reference value" field (shown in FIG. 7 (2)) in the "Call reference (2)" element of the call setting message (SETUP) shown in FIG. 6A. In addition, the signaling protocol portion 11 sets general data to the call setting message (SETUP).

Thereafter, the signaling protocol portion 11 stores the call setting message (SETUP) to an ATM cell with particular VPI/VCI values for controlling a call and sends the ATM cell to the ATM network 5 through the cell extracting/inserting portion 12 and the cell collecting/distributing portion 14 shown in FIG. 4.

The ATM network 5 sends back a call acceptance message (CALL-PROC) to the calling side ATM terminal 1 corresponding to the call setting message. In addition, the ATM network 5 sends the call setting message (SETUP) received from the ATM terminal 1 to the ATM terminal 2 corresponding to the address Y1 in the call setting message (SETUP).

When user intrinsic information is stored in the "High layer information type" field (shown in FIG. 24 (8)) of the "Broadband high layer information (8)" element in the call setting message (SETUP) (shown in FIG. 6A), the signaling portion 4 of the ATM terminal 2 identifies the application ID A1 of the calling side application A1 that has issued the originating call request set in the "High layer information" field shown in FIG. 24 (8), retrieves the corresponding calling side application A3, and sends the setting request for the connection CN1 to the application A3.

When the application A3 can set a connection, it sends a permission message (OK) to the signaling portion 4.

When the signaling portion 4 receives the permission message (OK), it sends a reply message (CONNECT) to the ATM network 5.

When the ATM network 5 receives the reply message (CONNECT) from the ATM terminal 2, it sends a reply acknowledge message (CONN-ACK) to the signaling portion 4 of the ATM terminal 2. In addition, the ATM network 5 sends the reply message (CONNECT) to the signaling portion 3 of the ATM terminal 1.

When the signaling portion 3 of the ATM terminal 1 receives the reply message (CONNECT) from the ATM network 5, it performs a call connecting process that is the same as step 5 of the first preferred embodiment (shown in FIG. 17). Thereafter, the signaling portion 3 executes an originating call completion informing process that is the same as step 6 shown in FIG. 17 so as to send a reply acknowledge message (CONN-ACK) to the ATM network 5.

Thus, the connection CN1 is set between the applications A1 and A3.

After the connection CN1 is set between the applications A1 and A3, when a new setting request for the connection CN2 is sent from the application A1 to the signaling portion 3, the signaling portion 3 sets the application ID A1 corresponding to the calling side application A1 to the "Broadband high layer information (8)" element of the call setting message (SETUP) and sends the resultant call setting message to the ATM network 5. Thereafter, as with the case of the connection CN1, the new connection CN2 is set between the applications A1 and A3.

Thus, a plurality of connections (for example, CN1 and CN2) can be set between desired applications (for example, A1 and A3).

Likewise, connections CN3 and CN4 can be set between the application A2 of the ATM terminal 1 and the application A4 of the ATM terminal 2.

In the sequence according to the second preferred embodiment, the process in the originating call state executed by the signaling portion 3 or 4 of the calling side ATM terminal 1 or 2 is the same as that according to the first preferred embodiment (shown in FIGS. 17 to 19).

Figure 25:
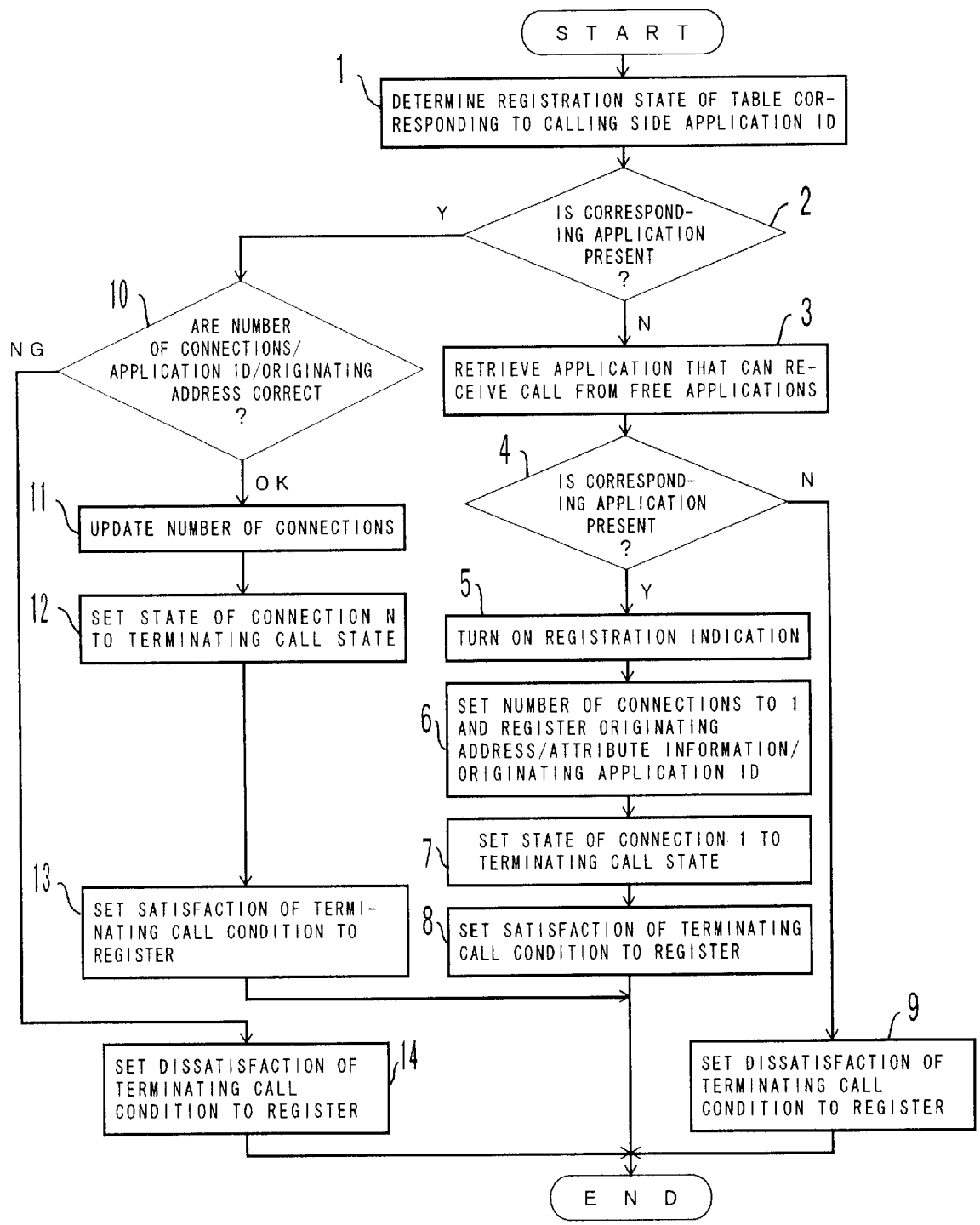
FIG. 25 is a flow chart showing an operation of a terminating call request accepting process according to the second preferred embodiment of the present invention.

The overall process in the originating call state executed by the signaling portion 3 or 4 of the called side ATM terminal 1 or 2 is the same as that according to the first preferred embodiment shown in FIGS. 20 and 21. FIG. 25 is a flow chart showing an operation of a terminating call request accepting process according to the second preferred embodiment. This process accords with step 1 shown in FIG. 20.

In FIG. 25, at step 1, the ATM call controlling portion 10 determines whether or not the application ID A1 of the calling side application A1 (that has issued an originating call) in the "High layer information" field (shown in FIG. 24 (8)) of the "Broadband high layer information (8)" element of the call setting message (SETUP) shown in FIG. 6A, has been registered in an "Application ID" field of the table (shown in FIG. 21) corresponding to any called side application in the application-related data portion 13 shown in FIG. 4.

Thereafter, the flow advances to step 2. At step 2, the ATM call controlling portion 10 determines whether or not a table of a called side application that has registered the calling side application ID A1 is present corresponding to the determined result at step 1.

When the table of the called side application that has registered the calling side application ID A1 is not present and thereby the determined result at step 2 is NO, the flow advances to step 3. Step 3 accords with the case that, for example, the calling side application A1 sends an originating call request for the first time in the sequence shown in FIG. 23.

At step 3, the ATM call controlling portion 10 retrieves the table from the application-related data portion 13 for an application that can receive a call from free applications that are not communicating.

Thereafter, the flow advances to step 4. At step 4, the ATM call controlling portion 10 determines whether or not a called side application is present corresponding to the retrieving process at step 3.

When a called side application corresponding to the retrieving process at step 3 is not present and thereby the determined result at step 4 is NO, the flow advances to step 9. At step 9, the ATM call controlling portion 10 sets the dissatisfaction of the terminating call condition to the terminating call condition determining register thereof. The state of the register is determined at step 2 shown in FIG. 20.

On the other hand, when a called side application corresponding to the retrieving process at step 3 is present and thereby the determined result at step 4 is YES, the flow advances to step 5. At step 5, the ATM call controlling portion 10 turns on the registration indication in the table (shown in FIG. 21) corresponding to the called side application in the application-related data portion 13.

Thereafter, the flow advances to step 6. At step 6, the ATM call controlling portion 10 sets the number of connections in the table to 1 and registers the address (originating address) of the calling side ATM terminal 1 stored in the "Calling party number (12)" element of the call setting message (SETUP) shown in FIG. 6A, the attribute information that is the same as that of the first preferred embodiment, and the calling side application ID (that has issued the originating call request) stored in the "Broadband high layer information (8)" of the call setting message (SETUP) shown in FIG. 6A, to the table.

Thereafter, the flow advances to step 7. At step 7, the ATM call controlling portion 10 sets the state of the connection 1 in the table to the terminating call state.

Thereafter, the flow advances to step 8. At step 8, the ATM call controlling portion 10 sets the satisfaction of the terminating call condition to the terminating call condition determining register thereof.

On the other hand, when a table of a called side application that has registered the calling side application ID A1 is present and thereby the determined result at step 2 is YES, the flow advances to step 10. Step 10 accords with the case that, for example, the calling side application A1 sets the connection CN1 and then sends a setting request for a connection CN2 in the sequence shown in FIG. 23.

At step 10, the ATM call controlling portion 10 determines the number of connections set on the table, the application ID, and the address of the calling side ATM terminal 1 or 2.

When the number of connections set in the table exceeds the number of connections that can be processed by the corresponding called side application, or when the application ID has not been set, or when the address of the calling side ATM terminal 1 or 2 has not been set, the determined result at step 10 is NG. In this case, the flow advances to step 14. At step 14, the ATM call controlling portion 10 sets the dissatisfaction of the terminating call condition to the terminating call condition determining register thereof.

On the other hand, when the determined result at step 10 is OK, the flow advances to step 11. At step 11, the ATM call controlling portion 10 updates (increments by 1) the number of connections in the table.

Thereafter, the flow advances to step 12. At step 12, the ATM call controlling portion 10 sets the state of the connection n on the table to the terminating call state (when the present terminating call request for the corresponding application is the second call request, n is 2, and so forth).

Thereafter, the flow advances to step 13. At step 13, the ATM call controlling portion 10 sets the satisfaction of the terminating call condition to the terminating call condition determining register thereof.

As described above, according to the second preferred embodiment, a plurality of connections can be securely set between a calling side application and a called side application corresponding to a calling side application ID (that has issued an originating call request) stored in the "Broadband high layer information (8)" of the call setting message (SETUP) shown in FIG. 6A.

Unlike with the first preferred embodiment, in the second preferred embodiment, sub-addresses are not used. Thus, no restriction of the address structure takes place. Consequently, the address resource can be effectively used.

In the structure according to the second preferred embodiment (shown in FIGS. 3 and 4), although the ATM terminals 1 and 2 are directly connected to the ATM network 5, as shown in FIG. 22, the sequence according to the second preferred embodiment can be applied to a structure in which an ATM network accommodates a cell assembling/disassembling unit (CLAD) connected with a user network interface (UNI) and the cell assembling/disassembling unit accommodates terminals.

In this case, a terminal ID that identifies a terminal accommodated in the cell assembling/disassembling unit is stored in the "Broadband high layer information (8)" element of the call setting message (SETUP) shown in FIG. 6A.

In the second preferred embodiment, a calling side application ID or terminal ID that has issued an originating call request is stored in the "Broadband high layer information (8)" of the call setting message (SETUP) shown in FIG. 6A.

However, as in the case of a third preferred embodiment of the present invention (that will be described next), when the first connection request is issued, an address of the application or the terminal is not set. Instead, when the second or later connection request is issued, a called side application ID or terminal ID is stored. In this case, a plurality of connections can be securely set between a calling side application or terminal and a called side application or terminal.

Third Preferred Embodiment

Next, a third preferred embodiment of the present invention will be described.

The structure of the third preferred embodiment is the same as that of the first preferred embodiment (shown in FIGS. 3 and 4).

As with the second preferred embodiment, in the third preferred embodiment, application IDs that represent the applications A1 to A4 shown in FIG. 3 are denoted by the same reference numerals A1 to A4.

In the third preferred embodiment, an application ID defined in the second preferred embodiment is sent with a new information element (IE) defined with a call setting message (SETUP) and a reply message (CONNECT), rather than the "Broadband high layer information" element of the call setting message (SETUP).

The information element (IE) is transparent data freely used between end-to-end applications.

FIGS. 26A and 26B are tables showing examples of data formats of a call setting message (SETUP) and a reply message (CONNECT) used in the third preferred embodiment. These data formats differ from those of the first preferred embodiment shown in FIGS. 6A and 6B in that a "User data information (18)" element that is a new information element (IE) is defined in the call setting message (SETUP) and the reply message (CONNECT).

FIG. 27 shows the detail of the "User data information (18)" element. In FIG. 27, a particular identifier that represents the "User data information" element is set to the "Information element identifier" field. When necessary, a called side application ID (APL-ID) is set to the "User data information" field.

With the above-described information element (IE), (a) the method by which a calling side application ID or a calling side terminal ID is set to the call setting message (SETUP), (b) the method by which a called side application ID or a called side terminal ID is set to the reply message (CONNECT), and (c) the method by which a calling side application ID, a called side application ID, a calling side terminal ID, and a called side terminal ID are set to the call setting message (SETUP) and the reply message (CONNECT), are known.

The process for setting a plurality of connections between a calling side application and a called side application corresponding to the method (a) is the same as the case of the second preferred embodiment, except that the element for setting a calling side application ID or a calling side terminal ID is not the "Broadband high layer information", but the "information element (IE)".

In addition, the process for setting a plurality of connections between a calling side application and a called side application corresponding to the method (c) is described as the third preferred embodiment, and will be described later.

Next, the process for setting a plurality of connections between a calling side application and a called side application corresponding to the method (b) will be described.

In the method (b), for the calling side ATM terminal 1 or 2, a calling side application ID or a calling side terminal ID is set to the new information element (IE) defined in a call setting message (SETUP). For the called side ATM terminal 1 or 2, an application or a terminal corresponding to the calling side application ID or the terminal ID is selected and a connection is set. In this case, the called side application ID or the called side terminal ID is set to the information element (IE) of the first reply message (CONNECT) corresponding to the call setting message (SETUP) and the resultant reply message is sent. Thus, since the calling side ATM terminal 1 or 2 sets the called side application ID or the called side terminal ID as well as the calling side application ID or the calling side terminal ID to the next call setting message (SETUP), a plurality of connections can be easily set between applications or terminals.

Figure 28:
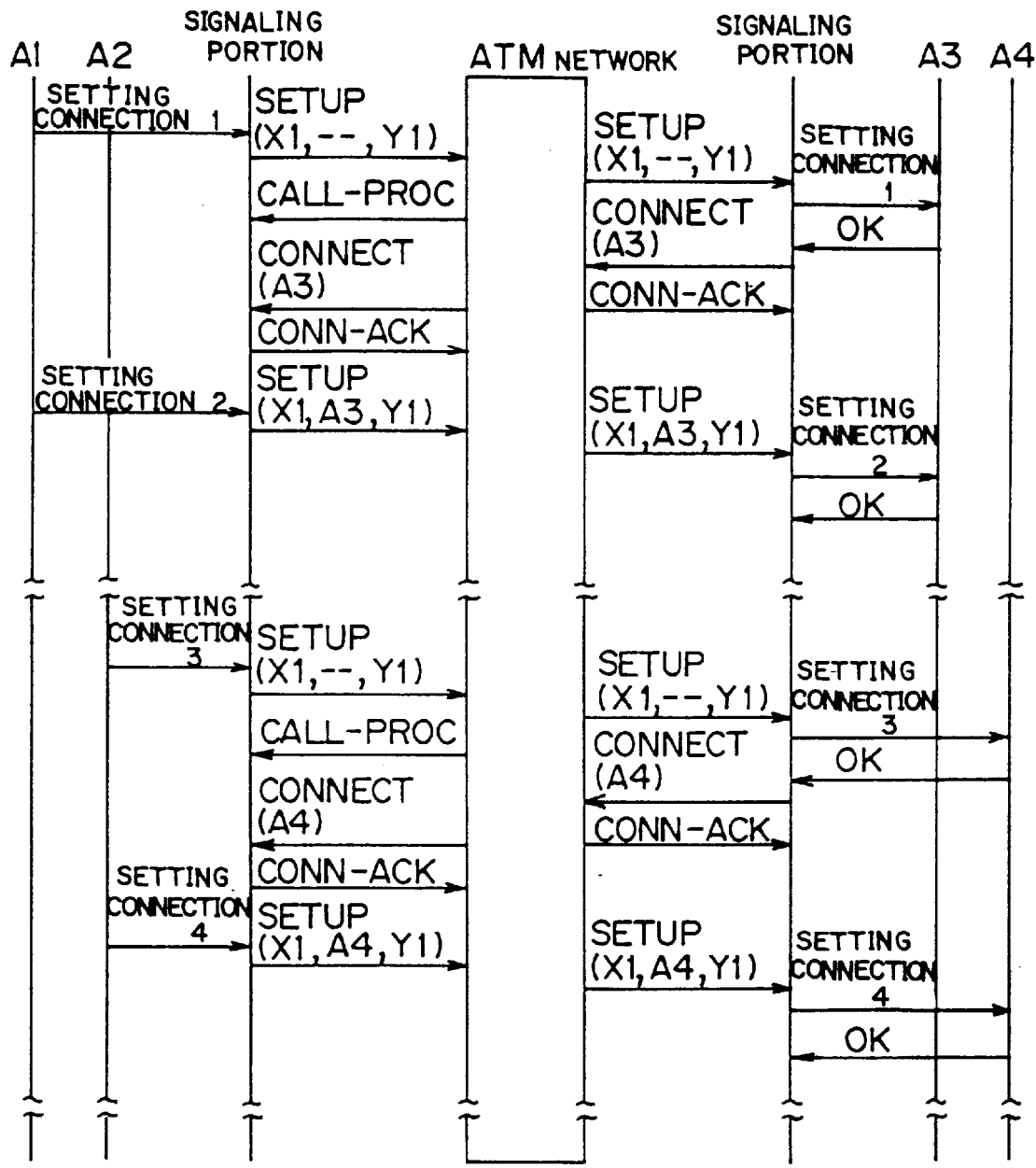
FIG. 28 is a schematic diagram for explaining a sequence according to a third preferred embodiment of the present invention.

FIG. 28 is a schematic diagram showing a sequence according to the third preferred embodiment of the present invention.

In the sequence shown in FIG. 28, the ATM call controlling portion 10 (shown in FIG. 4) of the signaling portion 3 in the calling side ATM terminal 1 executes a sequence of processes that is similar to that according to the first preferred embodiment shown in FIGS. 17 to 19.

In the process according to step 4 shown in FIG. 17, the signaling protocol portion 11 (shown in FIG. 4) of the signaling portion 3 in the calling side ATM terminal 1 sets user intrinsic information to the "User data information type" field (shown in FIG. 27) in a "User data information (18)" element of the call setting message (SETUP) (shown in FIG. 26A) corresponding to a command received from the ATM call controlling portion 10. In addition, the signaling protocol portion 11 sets dummy data to a "User data information" field shown in FIG. 27.

Moreover, the signaling protocol portion 11 sets the address X1 of the calling side ATM terminal 1 to the "Address/number digits (IA5 characters)" field or the "NSAP address octets" field (shown in FIG. 14 (12)) in the "Calling party number (12)" element of the call setting message (SETUP) shown in FIG. 26A. In addition, the signaling protocol portion 11 sets the address Y1 of the called side ATM terminal 2 to the "Address/number digits (IA5 characters)" field or the "NSAP address octets" field in the "Called party number (10)" element of the call setting message (SETUP) shown in FIG. 26A.

Furthermore, as with the first preferred embodiment, the signaling protocol portion 11 sets a unique call reference value corresponding to the originating call request to the "Call reference value" field (shown in FIG. 7 (2)) in the "Call reference (2)" element of the call setting message (SETUP) shown in FIG. 26A. In addition, the signaling protocol portion 11 sets general data to the call setting message (SETUP).

Thereafter, the signaling protocol portion 11 stores the call setting message (SETUP) (SETUP (X1, . . . , Y1) in FIG. 28) to an ATM cell with particular VPI/VCI values for controlling a call and sends the ATM cell to the ATM network 5 through the cell extracting/inserting portion 12 and the cell collecting/distributing portion 14 shown in FIG. 4.

The ATM network 5 sends back a call acceptance message (CALL-PROC) to the calling side ATM terminal 1 corresponding to the call setting message (SETUP). In addition, the ATM network 5 sends the call setting message (SETUP) received from the ATM terminal 1 to the ATM terminal 2 corresponding to the address Y1 of the call setting message (SETUP).

When the user intrinsic information has been set to the "User data information type" field (shown in FIG. 27) in the "User data information (18)" of the call setting message (SETUP) shown in FIG. 26A, and the dummy data has been set to the "User data information" field shown in FIG. 27, the signaling portion 4 of the ATM terminal 2 retrieves a called side free application A3 and sends a setting request for the connection CN1 to the application A3.

When the application A3 can set a connection, it sends a permission message (OK) to the signaling portion 4.

On the other hand, in the process according to step 3 shown in FIG. 20 according to the first preferred embodiment, the signaling portion 4 of the called side ATM terminal 2 sets the user intrinsic information to the "User data information type" field (shown in FIG. 27) in the "User data information (18)" element of the reply message (CONNECT) shown in FIG. 26B. In addition, the signaling portion 4 sets the application ID A3 to the "User data information" field shown in FIG. 27 and sends back the reply message (CONNECT) to the ATM network 5.

When the ATM network 5 receives the reply message (CONNECT) from the ATM terminal 2, it sends a reply acknowledge message (CONN-ACK) to the signaling portion 4 of the ATM terminal 2. In addition, the ATM network 5 sends the reply message (CONNECT) to the signaling portion 3 of the ATM terminal 1.

When the signaling portion 3 of the ATM terminal 1 receives the reply message (CONNECT) from the ATM network 5, it performs a call connecting process that is the same as step 5 of the first preferred embodiment (shown in FIG. 17). In the call connecting process, after the signaling portion 3 determines that the user intrinsic information has been set to the "User data information" field (shown in FIG. 27) in the "User data information (18)" element of the reply message (CONNECT) shown in FIG. 28B, it stores the called side application ID A3 in the "User data information" field shown in FIG. 27 to the "Application ID" field on the table (shown in FIG. 19) stored at the address corresponding to the application ID A1 of the calling side application A1 in the application-related data portion 13 shown in FIG. 4. When the calling side application A1 sends a call setting message (SETUP), it has a call reference value corresponding to that of the reply message (CONNECT). Thereafter, the signaling portion 3 of the ATM terminal 1 executes an originating call completion informing process that is the same as that at step 6 shown in FIG. 17. Thus, the signaling portion 3 sends a reply acknowledge message (CONN-ACK) to the ATM network 5.

Consequently, the connection CN1 is set between the applications A1 and A3.

When the application A1 issues a setting request for the connection CN2 once again, the ATM call controlling portion 10 (shown in FIG. 4) of the signaling portion 3 of the calling side ATM terminal 1 executes a sequence of processes that is the same as that of the first preferred embodiment shown in FIGS. 17 to 19.

In the process according to step 2 shown in FIG. 17, the ATM call controlling portion 10 (shown in FIG. 4) of the signaling portion 3 of the calling side ATM terminal 1 determines that the called side application ID A3 has been stored in the table (shown in FIG. 19) stored at the address corresponding to the application ID A1 of the application A1.

Thereafter, in the process according to step 4 shown in FIG. 17, the signaling protocol portion 11 (shown in FIG. 4) of the signaling portion 3 of the calling side ATM terminal 1 sets user intrinsic information to the "User data information type" field (shown in FIG. 27) in the "User data information (18)" element of the call setting message (SETUP) shown in FIG. 26A. In addition, the signaling protocol portion 11 sets the called side application ID A3 to the "User data information" field shown in FIG. 27.

The signaling portion 4 of the ATM terminal 2 that receives the call setting message (SETUP) through the ATM network 5 determines that a connection that is linked between the ATM terminal 1 with the address X1 and the application with the application ID A3 has been set, and sends a setting request for the connection CN2 to the application A3.

When a permission message (OK) is received from the application A3, as with the setting request of the connection CN1, the connection CN2 is set between the applications A1 and A3. In other words, a plurality of connections can be set between desired applications.

When connections CN3 and CN4 are set from the application A2 of the ATM terminal 1 to the application A4 of the ATM terminal 2, the above-described sequence is used.

Figure 29:
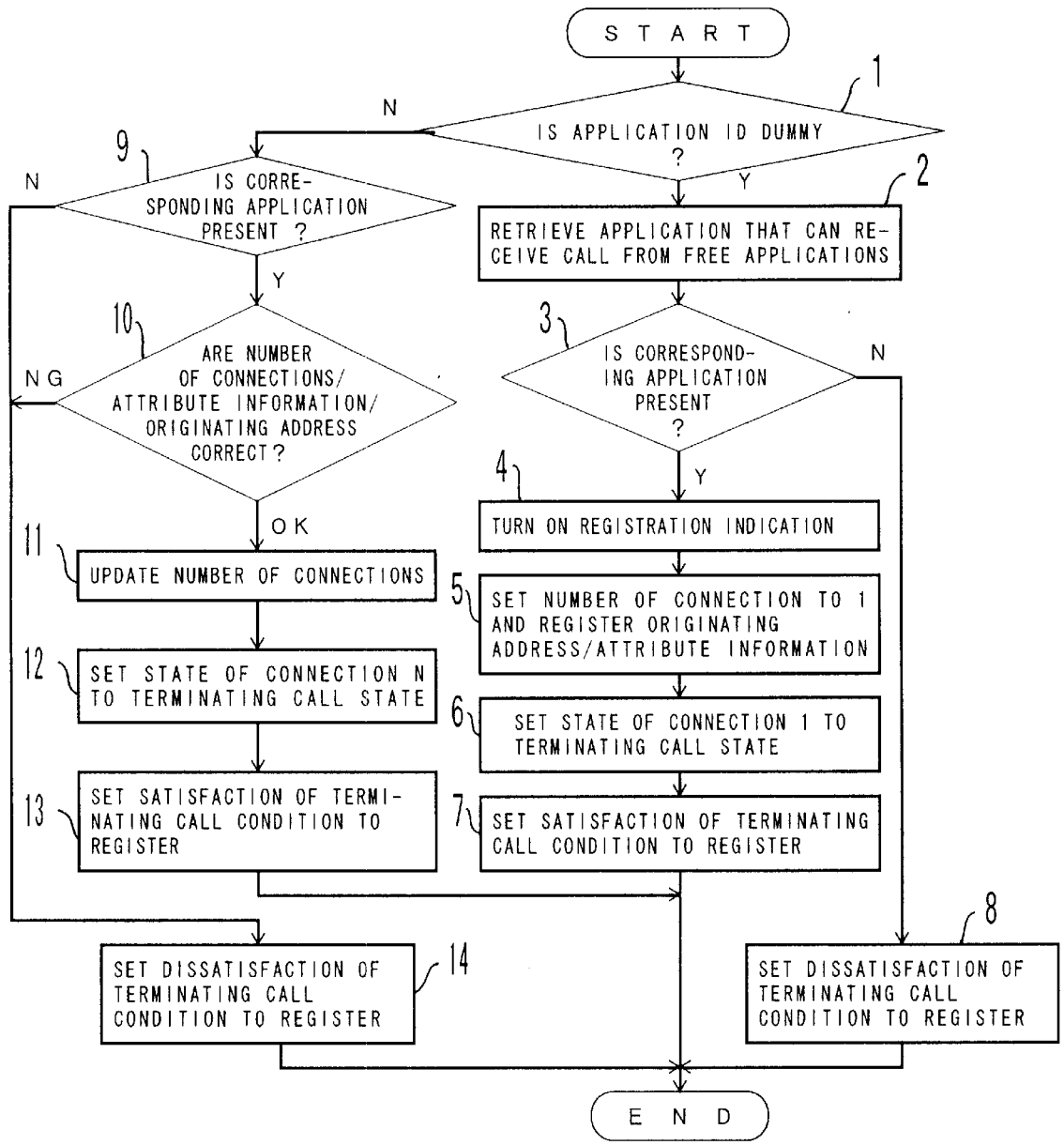
FIG. 29 is a flow chart showing an operation of a terminating call request accepting process according to the third preferred embodiment.

In the sequence according to the third preferred embodiment, the overall process in the originating call state executed by the signaling portion 3 or 4 of the called side ATM terminal 1 or 2 is the same as that according to the first preferred embodiment shown in FIGS. 20 and 21. FIG. 29 is a flow chart of an operation of a terminating call request accepting process according to the third preferred embodiment. The terminating call request accepting process of the third preferred embodiment accords with step 1 shown in FIG. 20.

In FIG. 29, at step 1, the ATM call controlling portion 10 determines whether or not dummy data has been set to the "User data information" field (shown in FIG. 27) in the "User data information (18)" element of the call setting message (SETUP) shown in FIG. 26A.

When the dummy data has been set and thereby the determined result at step 1 is YES, the flow advances to step 2. Step 2 accords with the case that, for example, the calling side application A1 sends an originating call request for the first time in the sequence shown in FIG. 28.

At step 2, the ATM call controlling portion 10 retrieves the table from the application-related data portion 13 for an application that can receive a call from free applications that are not communicating.

Thereafter, the flow advances to step 3. At step 3, the ATM call controlling portion 10 determines whether or not a calling side application corresponding to the retrieving process at step 2 is present.

When a called side application corresponding to the retrieving process at step 2 is not present and thereby the determined result at step 3 is NO, the flow advances to step 8. At step 8, the ATM call controlling portion 10 sets the dissatisfaction of the terminating call condition to the terminating call condition determining register thereof. The state of the register is determined at step 2 of FIG. 20.

On the other hand, when a called side application corresponding to the retrieving process at step 2 is present and thereby the determined result at step 3 is YES, the flow advances to step 4. At step 4, the ATM call controlling portion 10 turns on the registration indication of the table (shown in FIG. 21) corresponding to the called side application in the application-related data portion 13.

Thereafter, the flow advances to step 5. At step 5, the ATM call controlling portion 10 sets the number of connections in the table to 1 and registers the address (originating address) of the calling side ATM terminal 1 stored in the "Calling party number (12)" of the call setting message (SETUP) shown in FIG. 26A, and attribute information that is the same as that of the first preferred embodiment, to the table.

Thereafter, the flow advances to step 6. At step 6, the ATM call controlling portion 10 sets the state of the connection 1 in the table to the terminating call state.

Thereafter, the flow advances to step 7. At step 7, the ATM call controlling portion 10 sets the satisfaction of the terminating call condition to the terminating call condition determining register thereof.

On the other hand, when an application ID other than dummy data has been set to the "User data information" field (shown in FIG. 27) in the "User data information (18)" element of the call setting message (SETUP) shown in FIG. 26A and thereby the determined result at step 1 is NO, the flow advances to step 9. Step 9 accords with the case in which, for example, a calling side application A1 sets a connection CN1 with an application A3 and sends a setting request for a connection CN2 to the application A3 in the sequence shown in FIG. 28.

At step 9, the ATM call controlling portion 10 detects the address corresponding to the called side application ID of the call setting message (SETUP) in the application-related data portion 13 so as to determine whether or not an application corresponding to the called side application ID is present.

When the designated called side application is not present and thereby the determined result at step 9 is NO, the flow advances to step 14. At step 14, the ATM call controlling portion 10 sets the dissatisfaction of the terminating call condition to the terminating call condition determining register thereof. The state of the register is determined at step 2 shown in FIG. 20.

On the other hand, when the designated called side application is present and thereby the determined resultant step 9 is YES, the flow advances to step 10. At step 10, the ATM call controlling portion 10 detects the number of connections on the table, the attribution information, and the address of the calling side ATM terminal 1 or 2.

When the number of connections on the table exceeds the number of connections that can processed by the corresponding called side application, or when the attribute information has not been set, or when the address of the calling side ATM terminal 1 or 2 has not been set, the determined result at step 10 is NG. In this case, the flow advances to step 14. At step 14, the ATM call controlling portion 10 sets the dissatisfaction of the terminating call condition to the terminating call condition determining register thereof.

On the other hand, when the determined result at step 10 is OK, the flow advances to step 11. At step 11, the ATM call controlling portion 10 updates (increments by 1) the number of connections in the table.

Thereafter, the flow advances to step 12. At step 12, the ATM call controlling portion 10 sets the state of the connection n to the terminating call state (when the present terminating call request to the corresponding application is the second time, n is 2, and so forth).

Thereafter, the flow advances to step 13. At step 13, the ATM call controlling portion 10 sets the satisfaction of the terminating call condition to the terminating call condition determining register thereof.

In the structure according to the third preferred embodiment (shown in FIGS. 3 and 4), the ATM terminals 1 and 2 are directly connected to the ATM network 5. However, as shown in FIG. 22, the sequence according to the third preferred embodiment (see FIG. 28) can be applied to the structure in which the ATM network accommodates the cell assembling/disassembling unit (CLAD) connected with the user network interface and the cell assembling/disassembling unit accommodates terminals.

In this case, a terminal ID that identifies a terminal accommodated in the cell assembling/disassembling unit is stored in the "User data information (18)" element of the call setting message (SETUP) shown in FIG. 26A and the reply message (CONNECT) shown in FIG. 26B.

Fourth Preferred Embodiment

Next, a fourth preferred embodiment of the present invention will be described.

The structure of the fourth preferred embodiment is the same as the structure of the first preferred embodiment shown in FIGS. 3 and 4.

As with the third preferred embodiment, the fourth preferred embodiment accords with the method (c) in which a calling side application ID and a called side application ID or a calling side terminal ID and a called side terminal ID are set to the "User data information (18)" (shown in FIG. 27) newly defined in the call setting message (SETUP) (shown in FIG. 26A) and the reply message (CONNECT) shown in FIG. 26B.

FIG. 30 is a schematic diagram showing a sequence according to the fourth preferred embodiment of the present invention.

In the sequence shown in FIG. 30, the ATM call controlling portion 10 (shown in FIG. 4) of the signaling portion 3 of the calling side ATM terminal 1 executes a sequence of processes that is the same as that of the first preferred embodiment shown in FIGS. 17 to 19 for an originating call request received from the application A1.

In the process according to step 4 shown in FIG. 17, the signaling protocol portion 11 (shown in FIG. 4) of the signaling portion 3 of the calling side ATM terminal 1 sets user intrinsic information to the "User data information type" field (shown in FIG. 27) in the "User data information (18)" element of the call setting message (SETUP) shown in FIG. 26A and sets the calling side application ID A1 to the "User data information" field (shown in FIG. 27), and sets dummy data as the called side application ID corresponding to a command received from the ATM call controlling portion 10.

Moreover, the signaling protocol portion 11 sets the address X1 of the calling side ATM terminal 1 to the "Address/number digits (IA5 characters)" field or the "NSAP address octets" field (shown in FIG. 14 (12)) in the "Calling party number (12)" element of the call setting message (SETUP) shown in FIG. 26A corresponding to a command received from the ATM call controlling portion 10. In addition, the signaling protocol portion 11 sets the address Y1 of the called side ATM terminal 2 to the "Address/number digits (IA5 characters)" field or the "NSAP address octets" field (shown in FIG. 13 (10)) in the "Called party number (10)" element of the call setting message (SETUP) shown in FIG. 26A.

Furthermore, as with the first preferred embodiment, the signaling protocol portion 11 sets a unique call reference value to the "Call reference value" field in the "Call reference (2)" element of the call setting message (SETUP) shown in FIG. 26A corresponding to a command received from the ATM call controlling portion 10. In addition, the signaling protocol portion 11 sets general data to the call setting message (SETUP).

Thereafter, the signaling protocol portion 11 stores the call setting message (SETUP) (SETUP (X1, . . . , Y1) in FIG. 30) to an ATM cell with particular VPI/VCI values for controlling a call and sends the ATM cell to the ATM network 5 through the cell extracting/inserting portion 12 and the cell collecting/distributing portion 14 shown in FIG. 4.

Thereafter, the ATM network 5 sends back a call acceptance message (CALL-PROC) to the calling side ATM terminal 1 corresponding to the call setting message (SETUP). In addition, the ATM network 5 sends the call setting message (SETUP) received from the ATM terminal 1 to the ATM terminal 2 corresponding to the address Y1 of the call setting message (SETUP).

When user intrinsic information has been set to the "User data information type" field (shown in FIG. 27) in the "User data information (18)" element of the call setting message (SETUP) shown in FIG. 26A, and when the calling side application ID A1 has been set to the "User data information" field shown in FIG. 27, and when dummy data has been set as the called side application ID, the signaling portion 4 retrieves the called side free application A3 corresponding to the calling side application ID and sends a setting request for the connection CN1 to the application A3.

At this point, when the application A3 can set a connection, it sends a permission message (OK) to the signaling portion 4.

On the other hand, in the process according to step 3 of the first preferred embodiment shown in FIG. 20, the signaling portion 4 of the called side ATM terminal 2 sets the user intrinsic information to the "User data information type" field (shown in FIG. 27) in the "User data information (18)" element of the reply message (CONNECT) shown in FIG. 26B. In addition, the signaling portion 4 sets the calling side application ID A1 and the newly determined called side application ID A3 to the "User data information" field shown in FIG. 27 and sends back a reply message (CONNECT) to the ATM network 5.

When the ATM network 5 receives the reply message (CONNECT) from the ATM terminal 2, it sends a reply acknowledge message (CONN-ACK) to the signaling portion 4 of the ATM terminal 2. In addition, the ATM network 5 sends the reply message (CONNECT) to the signaling portion 3 of the ATM terminal 1.

When the signaling portion 3 of the ATM terminal 1 receives the reply message (CONNECT) from the ATM network 5, it executes a call connecting process that is the same as step 5 of the first preferred embodiment (shown in FIG. 17). In this case, after the signaling portion 3 determines that the user intrinsic information has been set to the "User data information type" field (shown in FIG. 27) in the "User data information (18)" element of the reply message (CONNECT) shown in FIG. 26B, the signaling portion 3 stores the called side application ID A3 in the "User data information" field shown in FIG. 27 to the application ID field in the table (shown in FIG. 19) stored at the address corresponding to the application ID A1 of the calling side application A1 set in the "User data information" field (shown in FIG. 27) in the application-related data portion 13 shown in FIG. 4. Thereafter, the signaling portion 3 of the ATM terminal 1 executes an originating call completion informing process according to step 6 of FIG. 17 so as to send a reply acknowledge message (CONN-ACK) to the ATM network 5.

Thus, the connection CN1 is set between the applications A1 and A3.

When the application A1 issues a setting request for a connection CN2 once again, the ATM call controlling portion 10 (shown in FIG. 4) of the signaling portion 3 of the calling side ATM terminal 1 executes a sequence of processes that is the same as that of the first preferred embodiment (see FIGS. 17 to 19).

The ATM call controlling portion 10 (shown in FIG. 4) of the signaling portion 3 of the calling side ATM terminal 1 executes a process according to step 2 shown in FIG. 17. In this process, the ATM call controlling portion 10 determines that the called side application ID A3 (shown in FIG. 19) has been stored at the address corresponding to the application ID A1 of the application A1.

Thereafter, in the process according to step 4 shown in FIG. 17, the signaling protocol portion 11 (shown in FIG. 4) of the signaling portion 3 of the calling side ATM terminal 1 sets user intrinsic information to the "User data information type" field (shown in FIG. 27) in the "User data information (18)" element of the call setting message (SETUP) shown in FIG. 26A corresponding to a command received from the ATM call controlling portion 10. In addition, the signaling protocol portion 11 sets the calling side application ID A1 and the called side application ID A3 to the "User data information" field shown in FIG. 27.

The signaling portion 4 of the ATM terminal 2 that has received the call setting message (SETUP) through the ATM network 5 determines that a connection that is linked between the calling side application A1 and the called side application A3 has been set corresponding to the calling side application ID A1 and the called side application ID A3 stored in the message, and sends the setting request for the connection CN2 to the application A3.

When the application A3 issues a permission message (OK), as with the case of the setting request for the connection CN1, the connection CN2 is set between the applications A1 and A3. In other words, a plurality of connections can be set between desired applications.

When connections CN3 and CN4 are set from the application A2 of the ATM terminal 1 to the application A4 of the ATM terminal 2, the same sequence is used.

Figure 31:
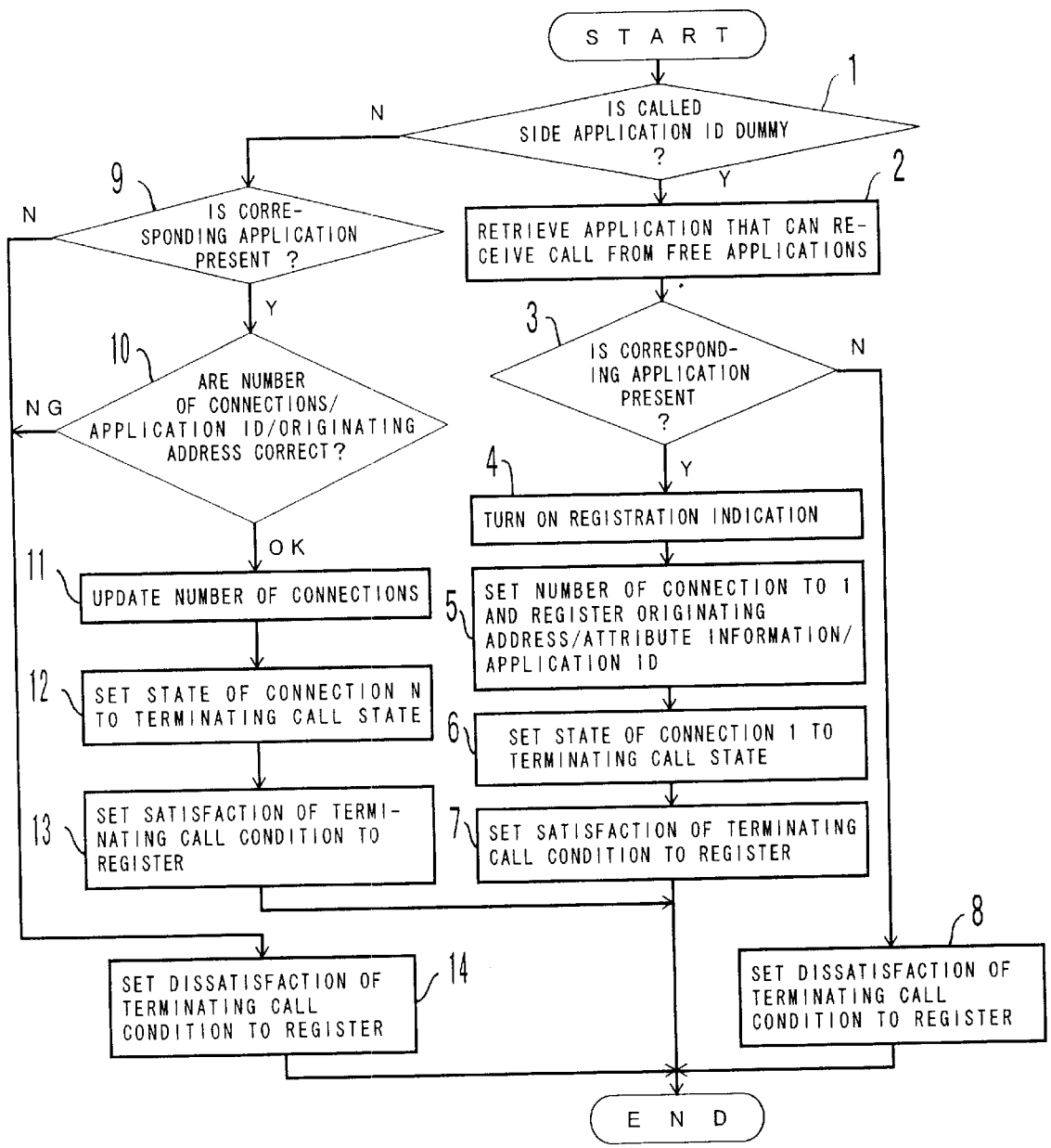
FIG. 31 is a flow chart showing an operation of a terminating call request accepting process according to a fourth preferred embodiment of the present invention.

In the sequence according to the fourth preferred embodiment, the overall process in the originating call state executed by the signaling portion 3 or 4 of the calling side ATM terminal 1 or 2 is the same as that of the first preferred embodiment (shown in FIGS. 20 and 21). FIG. 31 is a flow chart showing an operation of a terminating call request accepting process according to the fourth preferred embodiment. The terminating call request accepting process accords with step 1 shown in FIG. 20.

In FIG. 31, at step 1, the ATM call controlling portion 10 determines whether or not dummy data as a called side application ID has been set in the "User data information" field (shown in FIG. 27) in the "User data information (18)" element of the call setting message (SETUP) shown in FIG. 26A.

When the dummy data has been set and thereby the determined result at step 1 is YES, the flow advances to step 2. Step 2 accords with the case of which, for example, a calling side application A1 issues an originating call request for the first time in the sequence shown in FIG. 30.

At step 2, the ATM call controlling portion 10 retrieves the table in the application-related data portion 13 for an application that can receive a call from free applications that are not communicating.

Thereafter, the flow advances to step 3. At step 3, the ATM call controlling portion 10 determines whether or not a called side application corresponding to the retrieving process at step 2 is present.

When a called side application corresponding to the retrieving process at step 2 is not present and thereby the determined result at step 3 is NO, the flow advances to step 8. At step 8, the ATM call controlling portion 10 sets the dissatisfaction of the terminating call condition to the terminating call condition determining register thereof. The state of the register is determined at step 2 shown in FIG. 20.

When a called side application corresponding to the retrieving process at step 2 is present and thereby the determined result at step 3 is YES, the flow advances to step 4. At step 4, the ATM call controlling portion 10 turns on the registration indication in the table (shown in FIG. 21) corresponding to the called side application in the application-related data portion 13.

Thereafter, the flow advances to step 5. At step 5, the ATM call controlling portion 10 sets the number of connections in the table to 1 and stores the address (originating address) of the calling side ATM terminal 1 in the "Calling party number (12)" element of the call setting message (SETUP) shown in FIG. 26A, the attribute information that is the same as that of the first preferred embodiment, and the calling side application ID in the "User data information" field (shown in FIG. 27) in the "User data information (18)" element of the call setting message (SETUP) shown in FIG. 26A, to the table.

Thereafter, the flow advances to step 6. At step 6, the ATM call controlling portion 10 sets the state of the connection 1 in the table to the terminating call state.

Thereafter, the flow advances to step 7. At step 7, the ATM call controlling portion 10 sets the satisfaction of the terminating call condition to the terminating call condition determining register thereof.

When an application ID other than dummy data has been set to the "User data information" field (shown in FIG. 27) in the "User data information (18)" element of the call setting message (SETUP) shown in FIG. 26A, and thereby the determined result at step 1 is NO, the flow advances to step 9. Step 9 accords with the case that, for example, a calling side application A1 sets a connection CN1 with an application A3 and sends a setting request for a connection CN2 to the application A3 in the sequence shown in FIG. 30.

At step 9, the ATM call controlling portion 10 detects the address corresponding to the called side application ID of the call setting message (SETUP) in the application-related data portion 13, so as to determine whether or not an application corresponding to the called side application ID is present.

When the designated called side application is not present and thereby the determined result at step 9 is NO, the flow advances to step 14. At step 14, the ATM call controlling portion 10 sets the dissatisfaction of the terminating call condition to the terminating call condition determining register thereof. The state of the register is determined at step 2 shown in FIG. 20.

On the other hand, when the designated called side application is present and thereby the determined result at step 9 is YES, the flow advances to step 10. At step 10, the ATM call controlling portion 10 detects the number of connections on the table, the application ID, and the address of the calling side ATM terminal 1 or 2.

When the number of connections in the table exceeds the number of applications that can be processed by the called side application, or when the application ID has not been set, or when the address of the calling side ATM terminal 1 or 2 has not been set, the determined result at step 10 is NG. In this case, the flow advances to step 14. At step 14, the ATM call controlling portion 10 sets the dissatisfaction of the terminating call condition to the terminating call condition determining register thereof.

When the determined result at step 10 is OK, the flow advances to step 11. At step 11, the ATM call controlling portion 10 updates (increments by 1) the number of connections in the table.

Thereafter, the flow advances to step 12. At step 12, the ATM call controlling portion 10 sets the state of the connection n on the table to the terminating call state (when the present terminating call request to the corresponding application is the second call request, n is 2, and so forth).

Thereafter, the flow advances to step 13. At step 13, the ATM call controlling portion 10 sets the satisfaction of the terminating call condition to the terminating call condition determining register thereof.

In the structure according to the fourth preferred embodiment (shown in FIGS. 3 and 4), the ATM terminals 1 and 2 are directly connected to the ATM network 5. However, the sequence (shown in FIG. 30) according to the fourth preferred embodiment can be applied to the structure in which the ATM network accommodates the cell assembling/disassembling unit (CLAD) connected with the user network interface (UNI) and the cell assembling/disassembling unit accommodates terminals as shown in FIG. 22.

In this case, as with the third preferred embodiment, a terminal ID that identifies a terminal accommodated in the cell assembling/disassembling unit is stored in the "User data information (18)" element of the call setting message (SETUP) shown in FIG. 26A or the reply message (CONNECT) shown in FIG. 26B.

In the above-described third or fourth preferred embodiments, since sub-addresses are not used, no restriction takes place of the address structure. Thus, the address resource can be effectively used. In addition, since connection setting information can be sent from a called side to a calling side as well as from a calling side to a called side, connections can be flexibly set.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A method of containing settings of a plurality of connections to at least one user network interface for allowing a switch network to accommodate a plurality of applications, comprising the steps of:

assigning a unique sub-address to each of the applications;

setting sub-addresses of calling side applications and sub-addresses of called side applications to a call setting message and sending the call setting message to the user network interface; and setting at least one connection between a calling side application and a called side application corresponding to the sub-addresses through the user network interface.

2. A method of controlling settings of a plurality of connections to at least one user network interface for allowing a switch network to accommodate a plurality of applications, comprising the steps of:

assigning information identifying the applications;

setting application identification information to a broadband high layer information element included in a call setting message and sending the call setting message to the user network interface; and setting at least one connection between a calling side application and a called side application corresponding to the application identification information through the user network interface.

3. A method of controlling settings of a plurality of connections to at least one user network interface for allowing a switch network to accommodate a plurality of applications, comprising the steps of:

assigning information identifying the applications;

defining an information element included in a call setting message and a reply message received from a first called side in a normal sequence, the information element being end-to-end transparent data, the information element being definable end-to-end;

setting application identification information to the information element in the call setting message or the reply message and sending the call setting message or the reply message to the user network interface; and setting at least one connection between a calling side application and a called side application corresponding to the application identification information through the user network interface.

4. A method of controlling settings of a plurality of connections to at least one user network interface for allowing a switch network to accommodate a plurality of applications, comprising the steps of:

assigning information identifying the applications;

defining an information element included in a call setting message and a reply message received from a first called side in a normal sequence, the information element being end-to-end transparent data, the information element being definable end-to-end;

setting calling side application identification information to the information element in the call setting message or the reply message and sending the call setting message or the reply message to the user network interface; and setting at least one connection between a calling side application and a called side application corresponding to the calling side application identification information through the user network interface.

5. A method of controlling settings of a plurality of connections to at least one user network interface for allowing a switch network to accommodate a plurality of applications, comprising the steps of:

assigning information identifying the applications;

defining an information element included in a call setting message and a reply message received from a first called side in a normal sequence, the information element being end-to-end transparent data, the information element being definable end-to-end;

setting called side application identification information to the information element in the call setting message or the reply message and sending the call setting message or the reply message to the user network interface; and setting at least one connection between a calling side application and a called side application corresponding to the called side application identification information through the user network interface.

6. A method of controlling settings of a plurality of connections to at least one user network interface for allowing a switch network to accommodate a plurality of applications, comprising the steps of:

assigning information identifying the applications;

defining an information element included in a call setting message and a reply message received from a first called side in a normal sequence, the information element being end-to-end transparent data, the information element being definable end-to-end;

setting calling side and called side application identification information to the information element in the call setting message or the reply message and sending the call setting message or the reply message to the user network interface; and setting at least one connection between a calling side application and a called side application corresponding to the calling side and called side application identification information through the user network interface.

7. An apparatus for controlling settings of a plurality of connections to at least one user network interface for allowing a switch network to accommodate a plurality of applications, comprising:

means for assigning a unique sub-address to each of the applications;

means for setting sub-addresses of calling side applications and sub-addresses of called side applications to a call setting message and sending the call setting message to the user network interface; and means for setting at least one connection between a calling side application and a called side application corresponding to the sub-addresses through the user network interface.

8. An apparatus for controlling settings of a plurality of connections to at least one user network interface for allowing a switch network to accommodate a plurality of applications, comprising:

assigning information identifying the applications;

means for setting application identification information to a broadband high layer information element included in a call setting message and sending the call setting message to the user network interface; and means for setting at least one connection between a calling side application and a called side application corresponding to the application identification information through the user network interface.

9. An apparatus for controlling settings of a plurality of connections to at least one user network interface for allowing a switch network to accommodate a plurality of applications, comprising:

assigning information identifying the applications;

means for defining an information element included in a call setting message and a reply message received from a first called side in a normal sequence, the information element being end-to-end transparent data, the information element being definable end-to-end;

means for setting application identification information to the information element included in the call setting message or the reply message and sending the call setting message or the reply message to the user network interface; and means for setting at least one connection between a calling side application and a called side application corresponding to the application identification information through the user network interface.

10. An apparatus for controlling settings of a plurality of connections to at least one user network interface for allowing a switch network to accommodate a plurality of applications, comprising:

assigning information identifying the applications;

means for defining an information element included in a call setting message and a reply message received from a first called side in a normal sequence, the information element being end-to-end transparent data, the information element being definable end-to-end;

means for setting calling side application identification information to the information element in the call setting message or the reply message and sending the call setting message or the reply message to the user network interface; and means for setting at least one connection between a calling side application and a called side application corresponding to the calling side terminal identification information through the user network interface.

11. An apparatus for controlling settings of a plurality of connections to at least one user network interface for allowing a switch network to accommodate a plurality of applications, comprising:

assigning information identifying the applications;

means for defining an information element included in a call setting message and a reply message received from a first called side in a normal sequence, the information element being end-to-end transparent data, the information element being definable end-to-end;

means for setting called side application identification information to the information element in the call setting message or the reply message and sending the call setting message or the reply message to the user network interface; and means for setting at least one connection between a calling side application and a called side application corresponding to the called side application identification information through the user network interface.

12. An apparatus for controlling settings of a plurality of connections to at least one user network interface for allowing a switch network to accommodate a plurality of applications, comprising:

assigning information identifying the applications;

means for defining an information element included in a call setting message and a reply message received from a first called side in a normal sequence, the information element being end-to-end transparent data, the information element being definable end-to-end;

means for setting calling side and called side application identification information to the information element in the call setting message or the reply message and sending the call setting message or the reply message to the user network interface; and means for setting at least one connection between a calling side application and a called side application corresponding to the calling side and called side application identification information through the user network interface.

* * * * *